United States Patent
Kuechel

(10) Patent No.: US 6,804,011 B2
(45) Date of Patent: Oct. 12, 2004

(54) APPARATUS AND METHOD(S) FOR REDUCING THE EFFECTS OF COHERENT ARTIFACTS IN AN INTERFEROMETER

(76) Inventor: Michael Kuechel, Keplerstrasse 3, D-73447, Oberkochen (DE)

( * ) Notice: Subject to any disclaimer, the term of this patent is extended or adjusted under 35 U.S.C. 154(b) by 0 days.

(21) Appl. No.: 10/053,741

(22) Filed: Jan. 22, 2002

(65) Prior Publication Data

US 2003/0030819 A1 Feb. 13, 2003

(30) Foreign Application Priority Data

May 3, 2001 (DE) .......................................... 101 21 516

(51) Int. Cl.[7] .............................................. G01B 9/02
(52) U.S. Cl. ...................................................... 356/512
(58) Field of Search ................................ 356/485, 488, 356/494, 496, 511, 512, 513, 515, 520, 521, 455

(56) References Cited

U.S. PATENT DOCUMENTS

| | | | |
|---|---|---|---|
| 4,325,637 A | 4/1982 | Moore | |
| 4,732,483 A | 3/1988 | Biegen | |
| 4,743,117 A | 5/1988 | Kitabayashi et al. | |
| 5,357,341 A | 10/1994 | Kuchel et al. | |
| 5,737,081 A | 4/1998 | Freischlad | |
| 6,031,612 A | 2/2000 | Shirley | |
| 6,061,133 A | 5/2000 | Freischlad | |
| 6,643,024 B2 | * 11/2003 | Deck et al. | 356/496 |
| 2003/0043380 A1 | * 3/2003 | Deck et al. | 356/450 |

FOREIGN PATENT DOCUMENTS

DE 42 33 336 A 4/1994

OTHER PUBLICATIONS

Fringe '97, Proceedings of the 3rd International Workshop on Automatic Processing of Fringe Patterns held in Bremen, Germany, Sep. 15–17, 1997, Ed. Werner Juptner and Wolfgang Osten, pp–474–475.

* cited by examiner

Primary Examiner—Samuel A. Turner
Assistant Examiner—Michael A. Lyons
(74) Attorney, Agent, or Firm—Francis J. Caufield

(57) ABSTRACT

Interferometric apparatus and methods for reducing the effects of coherent artifacts in interferometers. Fringe contrast in interferograms is preserved while coherent artifacts that would otherwise be present in the interferogram because of coherent superposition of unwanted radiation generated in the interferometer are suppressed. Use is made of illumination and interferogrammetric imaging architectures that generate individual interferograms of the selected characteristics of a test surface from the perspective of different off-axis locations of illumination in an interferometer and then combine them to preserve fringe contrast while at the same time arranging for artifacts to exist at different field locations so that their contribution in the combined interferogram is diluted.

88 Claims, 25 Drawing Sheets

SINGLE RING
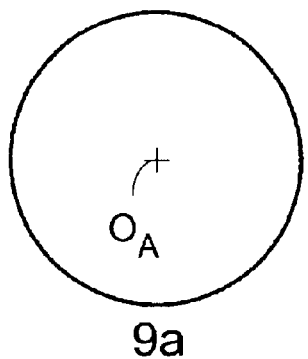
9a
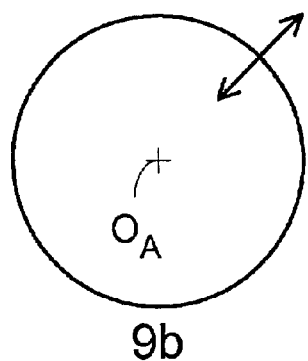
9b
MULTIPLE RINGS
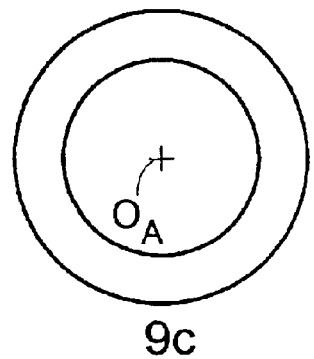
9c
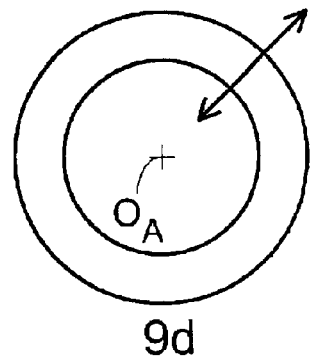
9d
FIG. 9

APPARATUS AND METHOD(S) FOR REDUCING THE EFFECTS OF COHERENT ARTIFACTS IN AN INTERFEROMETER

CROSS REFERENCE TO RELATED APPLICATION

This application claims priority from German Patent Application Number 10121516.9 filed on May 3, 2001, the entire contents of which are incorporated herein by reference.

BACKGROUND OF THE INVENTION

This invention in general relates to interferometric apparatus and methods and in particular to the construction and use of light sources by which coherent artifacts that would otherwise be present in an interferogram can be suppressed to improve the overall signal to noise ratio.

Optical systems of all types are adversely affected by background light, ghost reflections, and/or unwanted light scattered from elements in an optical assembly, and many techniques have been developed (such as baffles and apertures) to limit the degree to which such undesired light reaches an image. If the optical system uses incoherent light, the background simply adds to the overall light level at the image. In photographic systems, such light may be characterized as veiling glare, which operates to reduce contrast in the final photograph. Another common example is the reduction in visibility an automobile driver experiences in viewing through a dirty windshield where scattering operates to generate an overall glare that reduces the contrast in the surrounding landscape.

However, if the optical system uses coherent radiation (e.g., laser light), as is the case with many types of interferometers, scattered light can coherently interfere in the interferometric image to produce large amplitude light level changes with a spatial and/or temporal structure that can completely mask the desired interference pattern. The extreme sensitivity of these interferometers make them adversely affected by even the slightest background that can be produced by the smallest of imperfections in any practical system. Dust or tiny scratches on the optical surfaces of the system, or even variations in the antireflection coatings, are but a few examples of imperfections that can be problematic. Collectively, these flaws are often called optical artifacts, and when observed in coherent optical systems, are known as coherent artifacts.

A commonly used commercial interferometer geometry is known as the Fizeau geometry. The Fizeau geometry has many advantages: the optical system is common path; it has a minimum number of optical components; and is highly manufacturable. However, the unequal path design forces the use of coherent light sources. Hence, light from all locations in the system optics and interferometer, including scattering from small surface defects such as scratches, pits or dust (or volume defects such as bubbles) can influence the interferogram. These defects act as light scattering centers, producing characteristic ring patterns called Newton rings or "Bulls-eye" patterns that can imprint onto the measured phase map, affecting the extracted surface topography. Even the spurious micro-roughness of good polished surfaces and antireflection coatings contribute to the micro-shape of the wavefronts in the interferometer, and since the wavefronts are no longer common path in such a lateral scale of roughness, they establish themselves in the final measured wavefronts.

One common practice that is responsible for introducing artifacts is the use of commercially available optical components that have not been specifically designed for use in interferometer configurations and light sources with minimization of artifacts in mind yet possess other properties that make their use commercially attractive for economic reasons. Off-the-shelf lenses, for example, often possess desirable performance specifications in terms of aperture, field, focal length, and aberration control, but may have interior structure that, while suitable for other applications, introduce unwanted artifacts in interferometers.

One well-known method for reducing the effects of coherent artifacts in interferometers is to use a spatially extended source, typically in the shape of a disk. However, the spatial coherence of the source is compromised with an extended source resulting in the production of visible interference fringes for only a limited range of interferometer lengths determined by the source diameter.

Accordingly, a primary object of this invention is to describe a new extended source geometry that does not suffer from the contrast degradation of conventional extended sources yet provides excellent suppression of unwanted interference from surfaces and objects far from the object of interest to improve the accuracy and resolution of surface profiling using phase-shifting interferometry.

Another object of the invention is to provide a convenient way to modulate the phase of the interference, further benefiting particular applications developed for phase shifting interferometry.

Yet another object of the invention is to provide a way to suppress interference from surfaces parallel to the surface of interest, such as in the measurement of one surface of parallel flats.

It is yet another object of the invention to provide a source for reducing the effects of artifacts in interferometers using off-the-shelf components.

It is still another object of the invention to provide a source for use in reducing artifacts in unequal path length interferometers such as, for example, Fizeau, Mirau, and Twyman-Green types.

It is still another object of the invention to provide a source for use in reducing artifacts in interferometers in which retroreflective elements such as cat's eyes form part of the interferometer cavity.

Other objects of the invention will, in part, be obvious and will, in part, appear hereinafter when the description to follow is read in conjunction with the drawings.

SUMMARY OF THE INVENTION

Generally, the present invention relates to interferometric apparatus and methods for preserving fringe contrast in interferograms while suppressing coherent artifacts that would otherwise be present in the interferogram because of coherent superposition of unwanted radiation generated in the interferometer. Several different embodiments of the invention achieve this result through the use of illumination and interferogrammetric imaging architectures that generate individual interferograms containing the same phase information of preselected characteristics or properties of a test surface (e.g., wavefront, topography) from the perspective of different off-axis points of illumination in an interferometer. Such individual interferograms are combined to preserve fringe contrast while at the same time arranging for artifacts to exist at different field locations so that their contribution in the combined interferogram is diluted. Thus, the same phase differences in the interferometer, corresponding to specific locations on a test surface, are mapped through optics along different light paths.

One embodiment of the invention comprises an illumination mechanism producing an extended source structure, e.g., in the shape of a thin ring of nominally constant radius that is nominally centered around an interferometer system optical axis. The ring defines the interferometer source plane. The interferometer system projects the source illumination into an interferometer where the illumination is split into two separate illumination paths. The illumination from the two separate paths is recombined after exiting the interferometer and is projected onto a detector at an image plane where the interferogram is detected and subsequently analyzed.

In another embodiment, a point source is moved in a source plane in a manner so as to describe a circle of constant radius about the optical axis in less than the time it takes to expose one detector frame. In this way a "virtual" ring shaped source is established.

In another aspect of the invention, a source comprising at least one pair of oppositely spaced mutually coherent points of illumination simultaneously provide a pair of oppositely inclined plane wavefronts for use in reducing coherent artifacts in interferometers having retroreflective elements, such as cat's eyes, in the cavity.

In yet another embodiment, the radius of the source ring (produced directly or virtually) is changed dynamically, in either continuous or stepwise fashion, while the detector senses the interferogram. As the ring radius changes, the phase of the interferogram changes in a predictable way, providing the ability to modulate the interferometric phase in a manner required by phase-shifting or phase stepping interferometry applications.

In an aspect of the invention, a point source is moved laterally with respect to the optical axis, producing an interferometric phase change, while simultaneously the interferometric phase is shifted by another phase modulator so as to keep the interferometric phase nominally constant. In this way the interferometric phase is held constant while the illumination direction changes, substantially smearing out the effects of coherent artifacts. The additional phase shift can be accomplished with a conventional mechanical translator translating one of the interferometer surfaces or by tuning the illumination wavelength.

In another aspect of the invention, one surface of a transparent flat is measured in the presence of interference from the other surface by moving a point source laterally with respect to the optical axis, producing an interferometric phase change, while simultaneously the interferometric phase is shifted by another phase modulator so as to keep the interferometric phase of the interferogram produced by the desired surface of the flat nominally constant during the time it takes to expose one detector frame. In this way the interferometric phase from the desired surface is held constant while the interferometric phase from the other surface changes substantially, washing out the interference fringes from the undesired surface.

BRIEF DESCRIPTION OF THE DRAWINGS

The structure, operation, and methodology of the invention, together with other objects and advantages thereof, may best be understood by reading the detailed description in conjunction with the drawings in which each part has an assigned numeral that identifies it wherever it appears in the various drawings and wherein:

FIG. 9, comprising subfigures 9a–9d, shows various inventive source patterns employing solid and virtual single and double ring possibilities;

DETAILED DESCRIPTION OF THE INVENTION

The present invention generally relates to interferometric apparatus and methods for preserving fringe contrast in interferograms while suppressing coherent artifacts that would otherwise be present in the interferogram because of coherent superposition of unwanted radiation generated in the interferometer. Several different embodiments of the invention achieve this result through the use of illumination and interferogrammetric imaging architectures that generate individual interferograms of test surface properties of interest from the perspective of different points of illumination that all are distant from its optical axis, i.e. off-axis. These individual interferograms are then combined to preserve fringe contrast in an integral interferogram while at the same time arranging for artifacts to exist at different field locations so that the contribution of artifacts in the combined interferogram is diluted, smeared, or averaged out. Thus, the same phase differences in the interferometer corresponding to specific locations on a test surface are mapped through optics along different light paths. The invention includes other features for phase modulation that make it amenable for use with phase shifting and stepping interferometry techniques.

To understand the operation of the invention, it will be useful to first examine the nature of the source it employs to generate individual interferograms and how the phase information contained in each of those individual interferograms is substantially identical so that they can be beneficially combined while suppressing artifacts.

Any extended source can be thought of as a large number of physically separate point sources. From the perspective of each source point, the position of an artifact shifts in the field due to parallax. Therefore, a properly imaged final interferogrammetric image can be made to be the sum of images from individual interferograms corresponding to all the point sources, effectively smearing out the interference patterns stemming from the artifact. However, unlike typical extended sources, the source of the invention maintains good fringe contrast by assuring that the interferograms produced by each source point are identical (i.e., their optical path differences (OPD) are the same).

Figure 1:
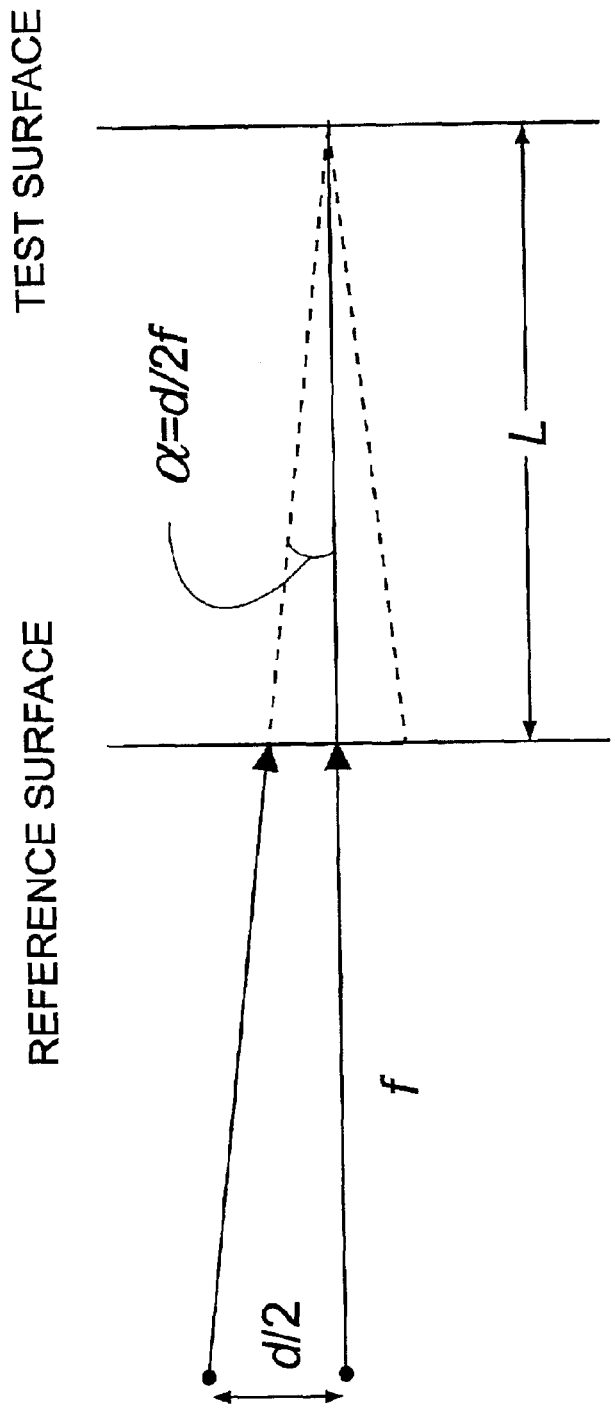
FIG. 1 is a diagrammatic view for estimating the difference in optical path distance (OPD) between interferograms produced by an on-axis test point with illumination from a source point on the edge of a source disk of diameter, d, and a source point at the center of the disk (on-axis). The on-axis source point path produces the solid on-axis (covered twice) line, while the off-axis source point produces the path shown by the dotted line.

To understand the difference between the inventive source and typical extended sources, it is useful to examine the properties of a typical disk source centered on the optical axis. Such a disk source does not fulfill the requirement met by the invention since source points at different positions along a radius of the disk produce different interferograms. This can be easily demonstrated by comparing the OPDs for a particular position on the test surface from a source point situated at the center of the disk (on-axis) and a source point on the edge of the disk. Assume for convenience an interferometer with a Fizeau geometry as shown in FIG. 1, a circular extended source of diameter d, an interferometer length L and collimator focal length f. For this fixed configuration, it can be shown that the difference, $\Delta$, in the OPDs is given approximately by:

$$\Delta \approx 2\sqrt{L^2 + \left(\frac{d}{2f}L\right)^2} - 2L \approx \frac{L}{4}\left(\frac{d}{f}\right)^2 \tag{1a}$$

Clearly, $\Delta$ increases rapidly with d, meaning that the contrast of the interferogram drops rapidly as the disk diameter grows. The following discussion along with FIG. 2 explains in detail why this is so and under what conditions this contrast reduction can be minimized.

Figure 2:
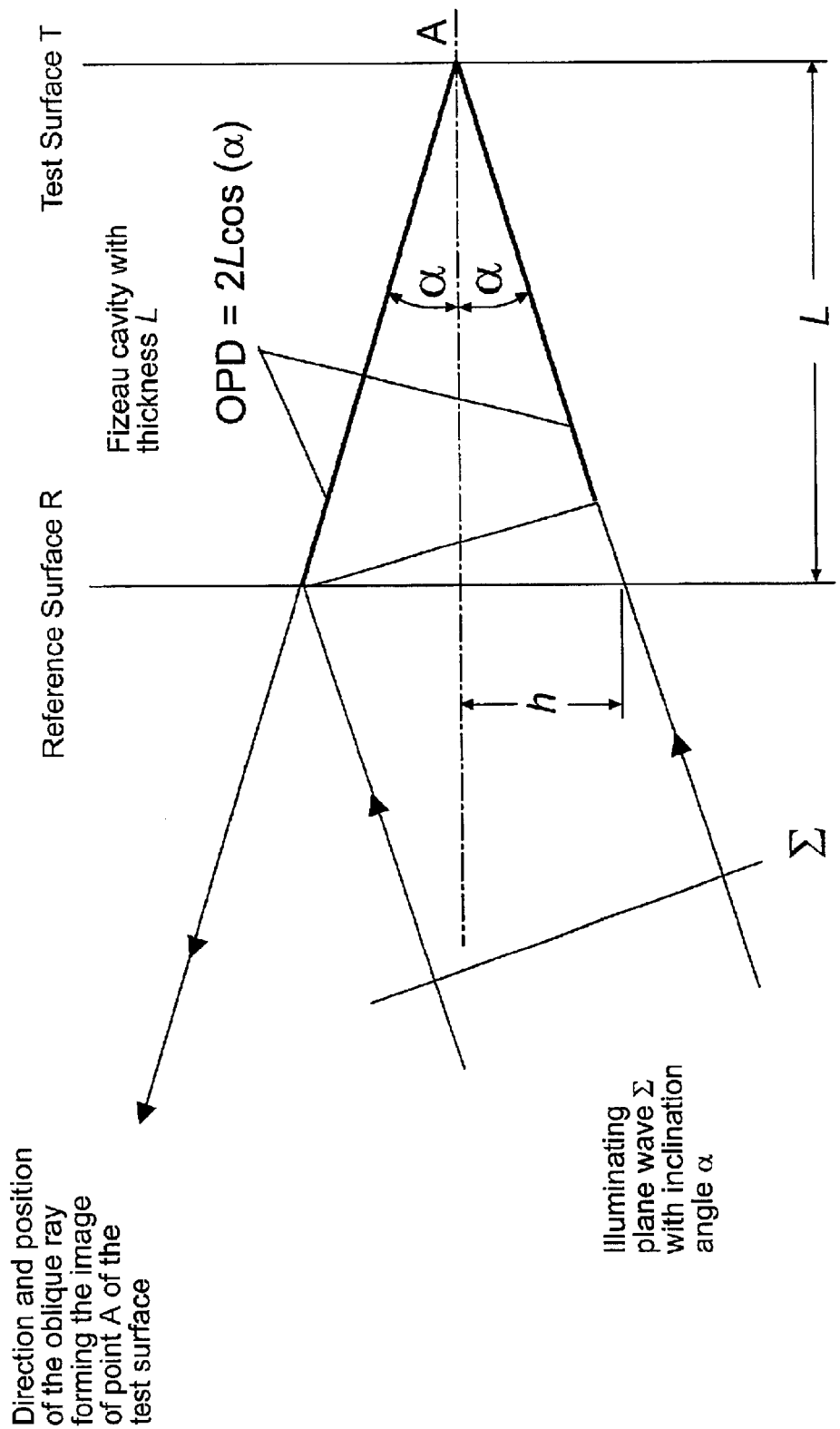
FIG. 2 is a diagrammatic illustration showing how the OPD in a Fizeau interferometer filled with air gets smaller as the angle of incidence, $\alpha$, increases where the thickness of the air gap is L.

Considering now the optical system depicted in FIG. 2 where an illuminating plane wave, $\Sigma$, impinges on a Fizeau interferometer of length, L, with an inclination angle, $\alpha$. The Fizeau interferometer is built from the reference surface, R, and the test surface, T, and the intervening space is filled with air. The front and back surfaces of the plates carrying the reference surface and the test surface, R and T, respectively, are omitted to simplify matters. The test surface T carries a point A, for which the oblique ray, which is the center ray for the imaging of point A, onto a CCD detector is shown. The CCD detector itself, as well as all the other optical elements comprising the interferometer, are shown in FIG. 5, and will be discussed in further detail later.

Figure 5:
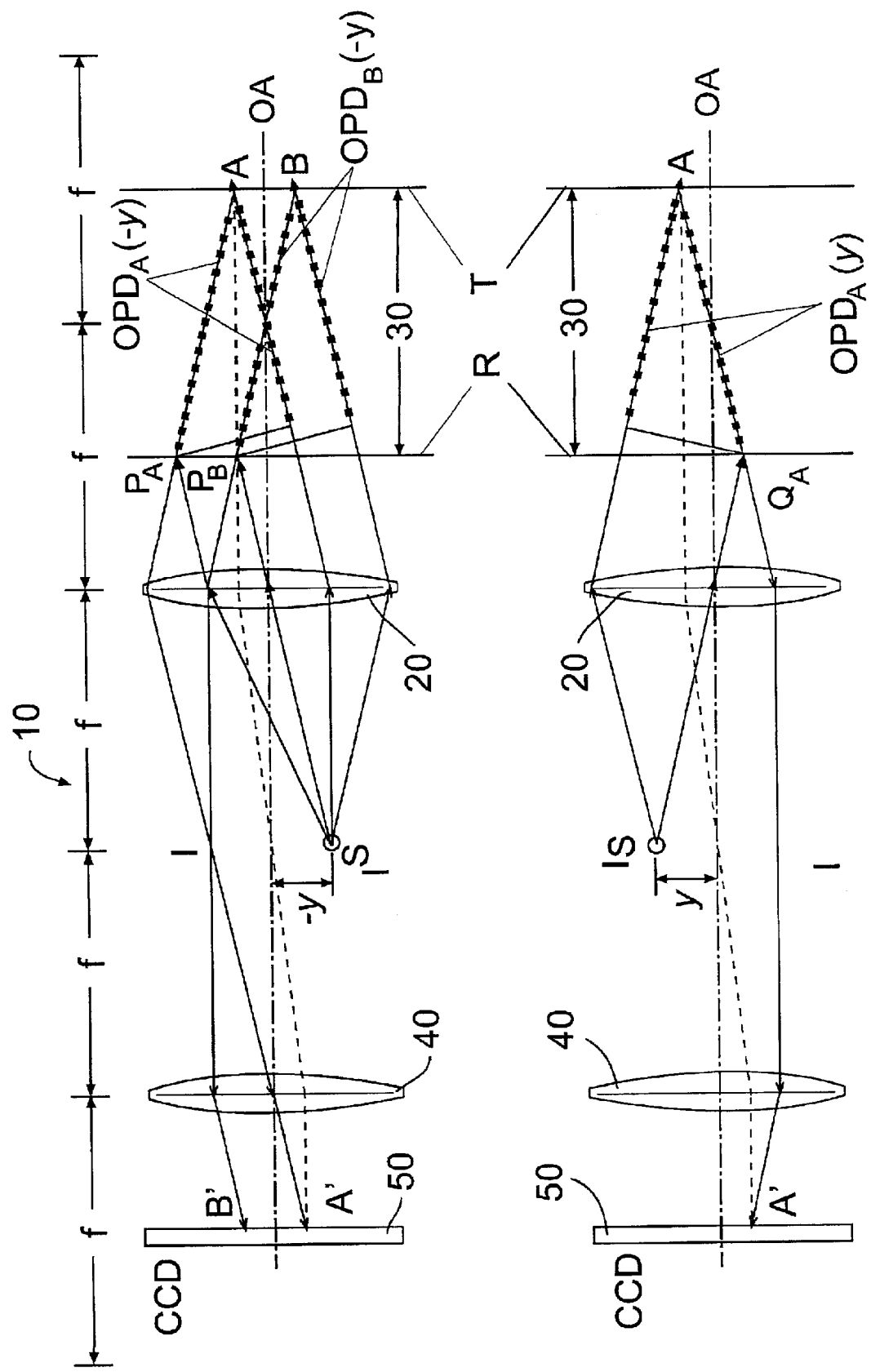
FIG. 5 is a diagrammatic elevational view of an embodiment of the invention showing a light source S, collimation and imaging optics, CCD detector, and Fizeau interferometer where object points A and B are imaged into image points A' and B'; A and B being located at a test surface plane T, and A' and B' being located at the CCD detector plane where the light source is shown in different positions with respect to the optical axis, OA. In the upper sketch, it is shifted from the axis to an off-axis distant position that is below the optical axis, and in the lower sketch by the same amount, but above the optical axis. The OPD is identical in both cases with the different object-points A and B having the same OPD as well.

It can seen from FIGS. 2 and FIG. 5, that different rays from the illuminating plane wave $\Sigma$, which originally have a lateral distance of 2h at the reference surface, will combine after reflection from the reference surface and the test surface, respectively, to finally give rise to the wanted interference effect on the detector. It should be noted that these two rays, after reflection on the two surfaces (inbound rays) are common path through the whole instrument until the detector, as long as the two surfaces are adjusted to be parallel. Ideally, all imperfections of the optical surfaces therefore have the same influence on both rays and do not show in the interference pattern. This fortunate behavior is not true if the rays deviate from each other by a very slight amount, which occurs when the interferometer is not perfectly nulled or the test piece has some deviation from planeness. This is the general case, and for this case, the invention provides an improvement in the quality of measurement.

The phase-difference, Φ, which is decisive for the final interference pattern on the detector, is a function of the optical path difference (OPD) within the Fizeau interferometer as well as of the wavelength of the light. The OPD is defined by the distance, L, of the two surfaces comprising the interferometer, as well as the inclination angle, α, of the illuminating beam. The following holds:

$$\varphi = \frac{2\pi}{\lambda} \cdot OPD = \frac{2\pi}{\lambda} \cdot 2L\cos(\alpha) \quad (1b)$$

In total, the phase-difference, Φ, is a function of the wavelength, λ, the interferometer thickness, L, as well as of the inclination angle, α. The position and direction of the rays illuminating and imaging the point A through all the interferometer optics changes with the inclination angle, α. If α is changed during the integration time of one camera frame, the influence of the micro roughness on all optical parts, with the exception of the test piece itself, changes rapidly and cancels out in the time-average. To have Φ remain stationary while changing the inclination angle, α, one can compensate either by adapting L or λ, as can be deduced from (1b) by a Taylor series expansion:

$$\varphi(\alpha + \Delta\alpha, \lambda + \Delta\lambda, L + \Delta L) = \varphi(\alpha, \lambda, L) + \frac{\partial \varphi}{\partial \alpha}\Delta\alpha + \frac{\partial \varphi}{\partial \lambda}\Delta\lambda + \frac{\partial \varphi}{\partial L}\Delta L \rightarrow \varphi(\alpha, \lambda, L) \quad (2)$$

Eq. (2) is fulfilled under the condition:

$$\frac{\partial \varphi}{\partial \alpha}\Delta\alpha + \frac{\partial \varphi}{\partial \lambda}\Delta\lambda + \frac{\partial \varphi}{\partial L}\Delta L = 0 \quad (3)$$

With $$\frac{\partial \varphi}{\partial \alpha} = -\frac{2\pi}{\lambda} 2L\sin(\alpha) \quad (4a)$$

$$\frac{\partial \varphi}{\partial \lambda} = -\frac{2\pi}{\lambda} \frac{2L\cos(\alpha)}{\lambda} \quad (4b)$$

$$\frac{\partial \varphi}{\partial L} = \frac{2\pi}{\lambda} 2\cos(\alpha) \quad (4c)$$

Eq. (3) can be fulfilled by $$\Delta L = L \tan(\alpha) \cdot \Delta\alpha \quad (5)$$

if λ is kept constant, or $$\Delta\lambda = \lambda \tan(\alpha) \cdot \Delta\alpha \quad (6)$$

if L is kept constant.

If α is changed from 0 to $\alpha_1$, then L should be changed from $L_0$ to $L_1$ according to:

$$\int_{L_0}^{L_1} \frac{1}{L} \cdot \Delta L = \int_0^{\alpha_1} \tan(\alpha) \cdot \Delta\alpha$$

$$\ln(L_1) = \ln(L_0) - \ln(\cos(\alpha_1)) = \ln\left(\frac{L_0}{\cos(\alpha_1)}\right)$$

$$L_1 = L_1(\alpha_1) = \frac{L_0}{\cos(\alpha_1)} \quad (7)$$

or similarly $$\lambda_1 = \lambda_1(\alpha_1) = \frac{\lambda_0}{\cos(\alpha_1)} \quad (8)$$

Figure 4:
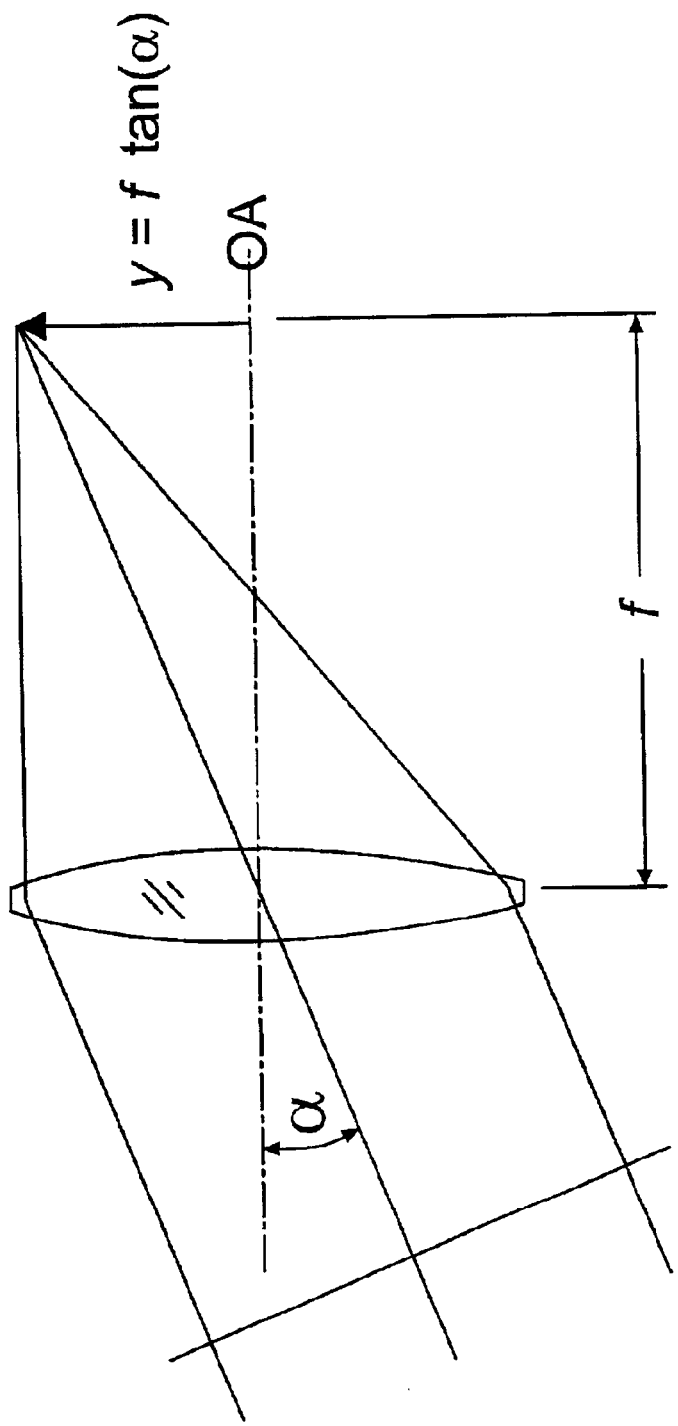
FIG. 4 is a diagrammatic illustration showing the relationship among the image height, field-angle, and focal length of a lens.

From the definition of focal length of a collimator by Gauss (see FIG. 4), it follows that:

$$y = f \cdot \tan \alpha \quad (9)$$

where y is the lateral distance of a point source from the optical axis of the collimator. Inserting (9) into (7) and (8) gives the necessary interferometer length or wavelength, respectively, when the location of the point source is shifted laterally from the on-axis position to the position y.

$$L_1(y) = L_0 \sqrt{1 - \frac{y^2}{f^2}} \quad (10)$$

$$\lambda_1(y) = \lambda_0 \sqrt{1 - \frac{y^2}{f^2}} \quad (11)$$

It can be seen from Eqs. (7) and (8), that the amount and sign of the compensation to be performed is the same for both signs of the inclination angle, α, i.e., for illumination from, for example, the two complimentary source points on either side of the optical axis shown in FIG. 5. The effect is described by cos(α), which is an even function. The same is true for Eqs. (10) and (11), where y is squared and therefore both sides on either side of the optical axis are equivalent for the location of the point source.

Having described several of the fundamental principles by which the invention operates, reference will now be made to the apparatus of FIG. 5 in more detail.

FIG. 5 is a diagrammatic elevational view of an embodiment of the invention designated generally as system 10. System 10 comprises a light source S, a point source such as a laser, collimation and imaging optics comprising collimation lens 20 and an objective or ocular lens 40, a CCD or other equivalent detector 50, and a Fizeau interferometer 30 where object points A and B on a test surface are imaged into image points A' and B' on the detector 50. A and B are located at a test surface plane T, and A' and B' are located at the CCD detector plane. The upper and lower sketches of FIG. 5 show the light source S in different positions both of which are distant or offset in their entirety with respect to the optical axis, OA. In the upper sketch, the light source S is shifted from the optical axis to an off-axis position below the optical axis, and in the lower sketch by the same amount, but above the optical axis. The OPD is identical in both cases with the different object-points A and B having the same OPD as well for reasons elaborated on above. The light irradiating the test surface T is collimated, and the reflected light traveling between the collimating lens 20 and the objective lens 40 is also collimated. Notice that for this type of imaging, even though only the center rays (oblique rays) are shown, all rays contributing to an image point have the same optical path length between object point and image point. In the case of an afocal system, even the optical path length between different object points in the same object plane have equal path lengths.

It should be apparent from studying FIG. 5 that the necessary compensation is independent of the sign of y, where at the upper part of FIG. 5, the location for the point source S is below the optical axis and in the lower part of FIG. 5, the location for the point source S is above the optical axis. In both cases the OPD in the interferometer is the same.

Another important fact that should also be apparent from the upper part of FIG. 5 is that, if the two surfaces comprising the Fizeau interferometer 30 are exactly parallel, then no "fringes" appear on the CCD-camera. Two points A and B are considered in the upper part of FIG. 5, and both have exactly the same OPD. In other words: the OPD does not change if point B is shifted to the position of point A. Therefore both lay on the "same interference fringe", which is infinitely wide in this case. The same is true for the other coordinate x, which is not shown in FIG. 5. This can be deduced by considering that the plane wavefront impinging on the interferometer is perpendicular to the surfaces of the interferometer and therefore any point "above" A (above the plane of the sketch), or below A, has the same OPD as A. Therefore, what holds for point A holds true for the whole surface of T. It is now clear that the location of the point source S may describe a circle with radius r=|y| without changing the OPD of the interferometer as a whole. Any of these locations will contribute to the same, stationary interference pattern in an incoherent, but constructive, way. Therefore, all of these patterns can be accumulated on a CCD-chip during the exposure time for one frame without degrading the interference contrast or integrated by combining a series of frames by accumulating them in an adding buffer, or the like.

In the foregoing manner, means have been provided for directing radiation onto an object being studied in an interferometer from different locations that are distant with respect to an optical axis such that radiation from the locations is incident to the same points on the object along optical paths having substantially identical optical path differences in the interferometer to generate interfering wavefronts; the radiation from each location generating optical interferometric beams in which the properties of interest in the object, such as the wavefront it returns or its topography, are encoded as substantially identical phase information while the field position of phase information corresponding to artifacts differs because of different parallax perspectives from each of the different locations.

Alternatively, an extended, static ring-shaped source may be used. In this case, the "individual" interference patterns of each of the millions of points forming the extended source add up coherently, but again in a constructive fashion. Also, as will be seen, a rotating point source or laterally shifted source ("dynamic") may also be used. To form a ring source, use may be made of a point source with a bulk optic axicon or its diffractive equivalent. Combinations of such sources may also be beneficially used.

FIG. 5 shows, that for different locations of the point source S, the whole course of the rays through the optical system is different. That is exactly the desired effect, since this is the way to overcome the coherent artifacts by effectively using an extended aperture. This property, along with the various other apparatus and methods to be described, preserves the spatial coherence with a single ring shaped source, a rotating point source, or a laterally shifted source with appropriate compensation for the variation of the OPD either by varying the interferometer-length, L, or by the wavelength, λ, or both, provides an unequal path interferometer, such as a Fizeau interferometer, having high imaging quality for very fine object details as well as the very good resolution of very small surface height variations that can be achieved with equal path interferometers such as Michelson or Mirau type interferometers.

Until now, only the suppression of coherent noise was discussed. But, it is also possible, by varying the distance y of the point source S and simultaneously adjusting the OPD, to suppress the interference from an unwanted third surface within a "double" Fizeau interferometer. This will be discussed with reference to FIG. 6.

Figure 6:
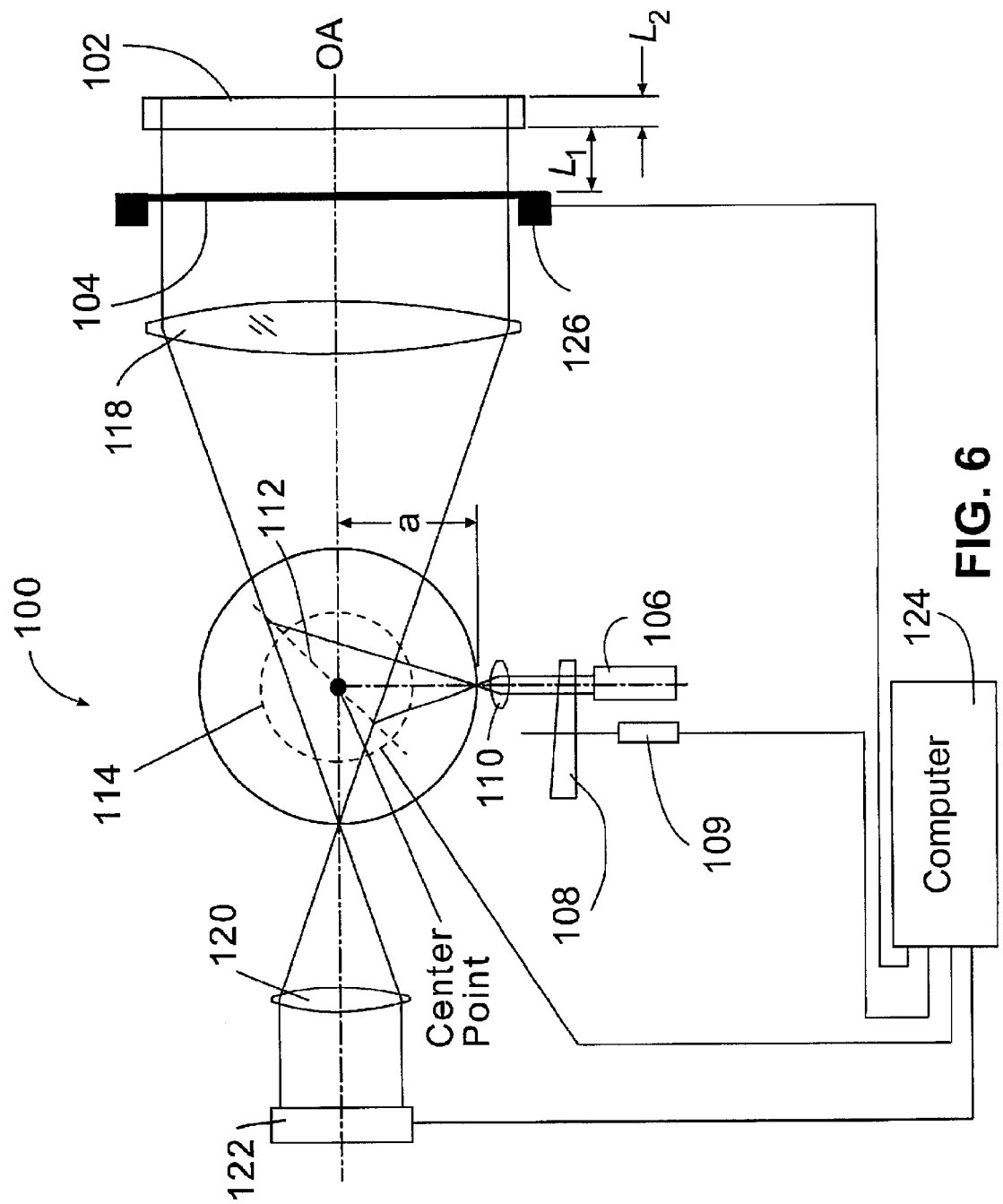
FIG. 6 is a diagrammatic elevational view of an embodiment of the invention in which a PZT, a rotatable beam splitter, and rotating wedge act as a double phase shifting means as well as a virtually extended source.

FIG. 6 is a diagrammatic elevational view of an embodiment of the invention designated generally as system 100. Generally, system 100 is a Fizeau interferometer that utilizes a PZT, a rotatable beam splitter, and rotating wedge to act in concert as a double phase shifting means as well as a "virtually extended source" in the measurement of a transparent plane parallel plate. The transparent plate to be measured is shown at 102 with a reference surface at 104. A source 106 passes through a rotating wedge 108 to be imaged on a rotatable beam splitter 112 and thereafter onto the plate 102 via imaging optics comprising converging lens 110 and collimator lens 118. A well-known rotating device 114 is responsible for selectively rotating beam splitter 112 under the control of a computer 124. Reflected light beams from the reference surface 104 and test surface 102 are imaged onto a suitable sensor 122 via collimator lens 118 and objective or ocular lens 120. The output of the sensor 122 is fed to the computer 124 for well-known phase and subsequent numerical analysis along with any image processing requirements for display and metrology purposes. Computer 124 also controls a motor 109 connected to wedge 108 for selectively rotating it, and also connects with a PZT 126 that selectively drives reference 104 to modulate it along the optical axis, OA.

As shown, three coherent waves will interfere in system 100. The first is the portion of the illuminating plane wave reflected from the reference surface 104, the second is the portion reflected from the front surface of the transparent plate 102, the third is the portion reflected from the back surface of the transparent plate 102. Because either the front surface or the back surface is to be measured at one time, the presence of the remaining reflection acts as a disturbance, and in this special case, the disturbance is of the same order of magnitude as the desired wave. The influence of this unwanted third wave can be cancelled by introducing two independent phase shifts using the components of system 100. Since at a solid plane parallel plate, it is not possible to change the relative phase of the two reflections of the front and back-surface by physical motion of one of the surfaces with respect to the other, a change in the illuminating wavelength can give the necessary degree of freedom needed to discriminate between the reflections in the final measured phase-map. The same is possible here, but the change in wavelength is now substituted with a change in the inclination angle α of the plane wave illuminating the Fizeau "double" interferometer.

Figure 3:
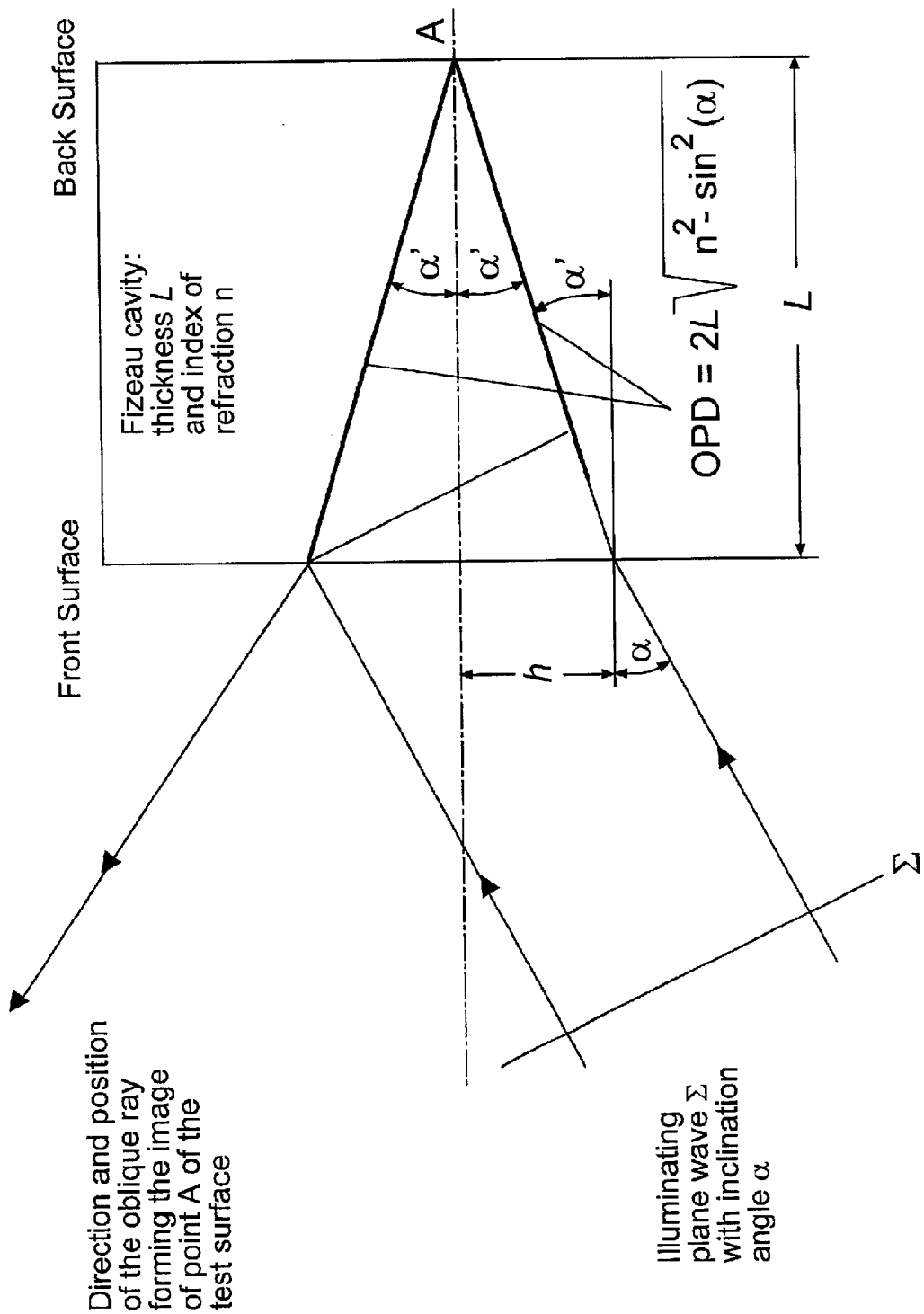
FIG. 3 is similar to FIG. 2 where the Fizeau interferometer is filled with glass of index n (plane parallel transparent plate) instead of air as in FIG. 2.

Reference is now made to FIG. 3 which shows that this inclination angle gives rise to a change in the OPD of a solid glass plate with thickness, L, and index of refraction, n, of:

$$OPD = 2L\sqrt{n^2 - \sin^2\alpha}. \tag{12}$$

For a glass-plate, for example, of L=5mm with an index of refraction of n=1.5, α has to take on the following tabulated values for adjacent changes of the OPD of λ/2, (λ=633nm):

|  | $0*\lambda/2$ | $1*\lambda/2$ | $2*\lambda/2$ | $3*\lambda/2$ | $4*\lambda/2$ | $5*\lambda/2$ | $6*\lambda/2$ |
|---|---|---|---|---|---|---|---|
| α [°] | 0.000 | 0.558 | 0.790 | 0.967 | 1.117 | 1.248 | 1.368 |
| y [mm] | 0.000 | 4.872 | 6.890 | 8.439 | 9.745 | 10.895 | 11.935 |

The last row in the table shows the lateral shift of the point source off the optical axis that would be necessary if a collimator lens with a focal length of 500 mm were used.

A change in the inclination angle is easily produced in system 100 by changing the angle of the beam splitter 112 in FIG. 6. The beam splitter 112 is mounted on a rotation-device 114 that is controlled by the computer 124, which also acquires the detector frames for the measurement. The second independent phase shift, which is necessary for full control in the general case, is performed by the conventional PZT-device 126, shifting the reference surface 104 along the optical axis, OA.

This example demonstrates that in many cases this invention provides a substitute for the use of a tunable light source. In FIG. 6, in addition to the rotatable beam splitter 112, a rotating glass wedge 108 is shown. Wedge 108 can be used with the beam-splitter 112 to further reduce coherent noise, as described before. In that case, the virtual orbits of the light source around the optical axis may describe ellipses, where one axis is given by the wedge-angle and is fixed, and the other axis of the ellipse is defined by the angular movement of the beam splitter 112 and can be controlled to fit the needs for suppressing the unwanted influence of one of the surfaces of the parallel plate.

Figure 7A:
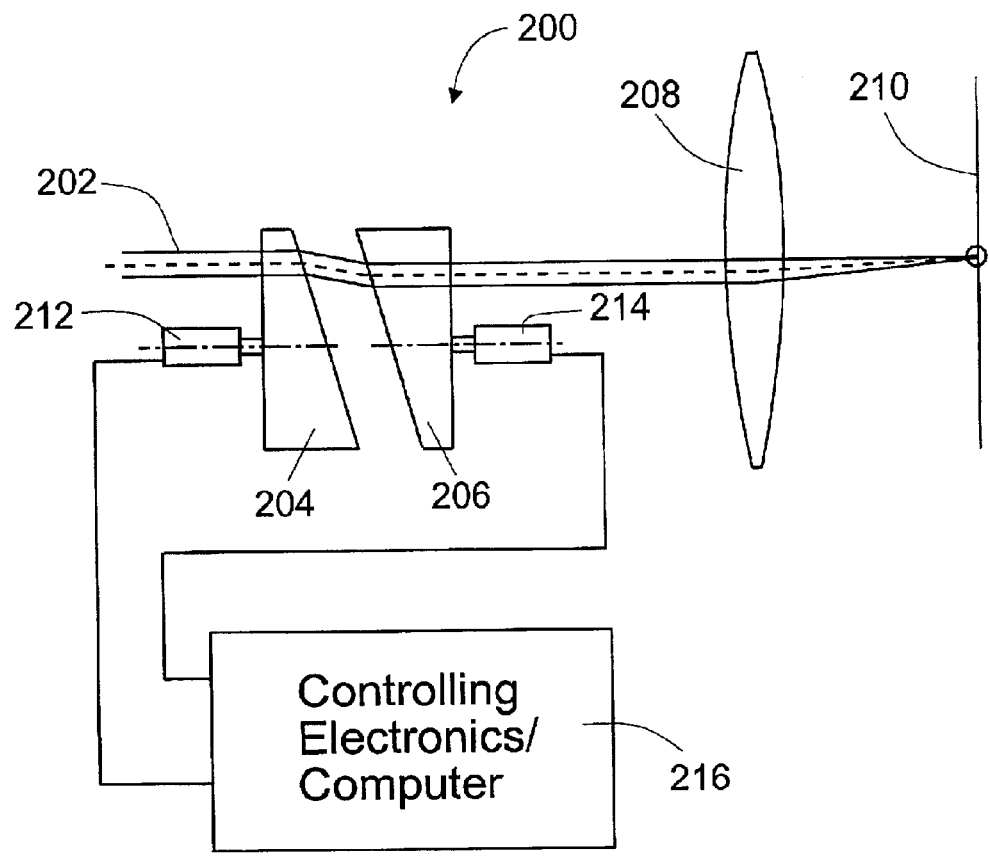
FIG. 7A is a diagrammatic elevational view of another embodiment of the invention in which two wedges in series, controlled by special electronics or a computer, describe a multiple of patterns in the focal plane of a lens, e.g., circles with different diameters, ellipses with different small and long axes, lines of different orientations.

Another very favorable solution is to use two wedges in sequence as shown in FIG. 7A in which a diagrammatic elevational view of another embodiment of the invention appears designated generally as system 200. In system 200, two wedges in series, controlled by dedicated electronics or a computer, describe a multiple of patterns in the focal plane of a lens, e.g., circles with different diameters, ellipses with different minor and major axes, and lines of different orientations, all of which can be driven synchronously together and also synchronized with the camera frames while at the same time having their angular phase relation altered, also under control of the computer 216.

As seen in FIG. 7A, system 200 comprises a light bundle 202 provided in any well-known manner, a pair of series mounted rotatable wedges 204 and 206 driven, respectively, by motors 212 and 214, both under the control of a computer 216 or other suitable control electronics. Light bundle 202 is selectively deviated by wedges 204 and 206 in accordance with their relative positions and angular speed of rotation, and is subsequently focused to a focal plane 210 via a lens system 208 that is diagrammatically shown. The image of the light bundle 202 in the focal plane 210 may now be used as the extended interferometer source to suppress artifacts while enhancing signal to noise performance in the interferogram.

If wedges 204 and 206 have the same wedge angle, they can be adjusted to cancel their effect, i.e., the focused point remains on the optical axis while the wedges are spinning synchronously. But if the wedges are rotated by 180° with respect to each other, their effects are added and the point describes a circle with a maximal radius. Intermediate positions of the relative rotation of the wedges 104 and 106 can operate to provide any radius r between zero and $r_{max}$. Well defined, discrete radii are needed for the case of canceling out one wave and at the same time reducing coherent noise. It should also be apparent that pairs of reflective scanning mirrors rotatable about mutually perpendicular axes can be used in system 200 for this purpose or in system 100 of FIG. 6 for similar reasons. In the foregoing manner, phase shifting is managed by changing the phase of the rotation of motors 212 and 214 with respect to one another.

Figure 7B:
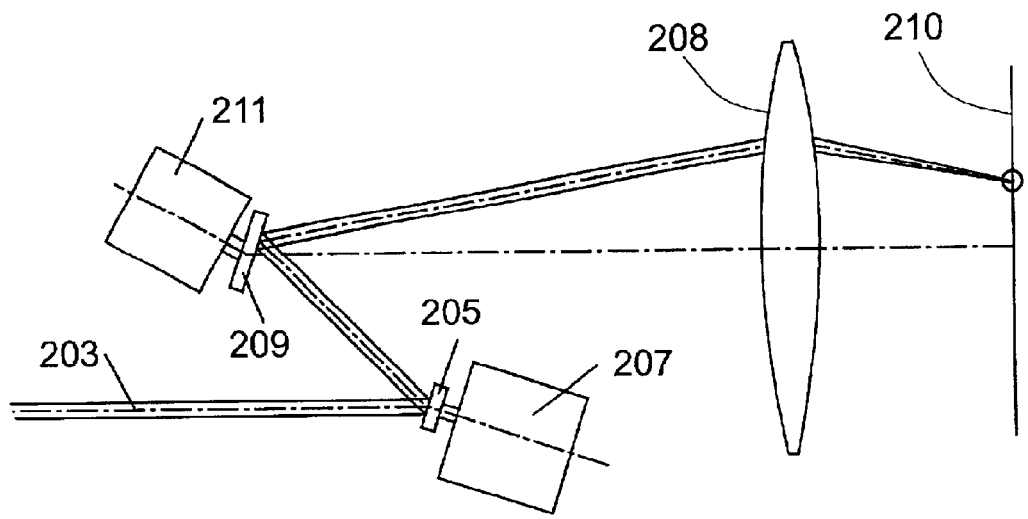
FIG. 7B is a diagrammatic elevational view of another embodiment of the invention in which two mirrors provide results equivalent to those of the embodiment of FIG. 7A.

FIG. 7B is an embodiment employing two mirrors in a row by which phase-shifting can be managed by changing the phase of the rotation of motors on which the mirrors are mounted. Here, mirrors 205 and 209 are mounted for rotation on motors 207 and 211, respectively. The surfaces of the mirrors 205 and 209 are made to be not perpendicular to the optical axis (mirror "wedges"). Thus, an incoming beam 203 follows a cone like output as in the case of the wedges above and is dependent on the relative phase of the motors 207 and 209. This effect can be cancelled or added by the two mirrors in a row, so the mirrors are fully equivalent to the wedges in transmission.

Figure 7C:
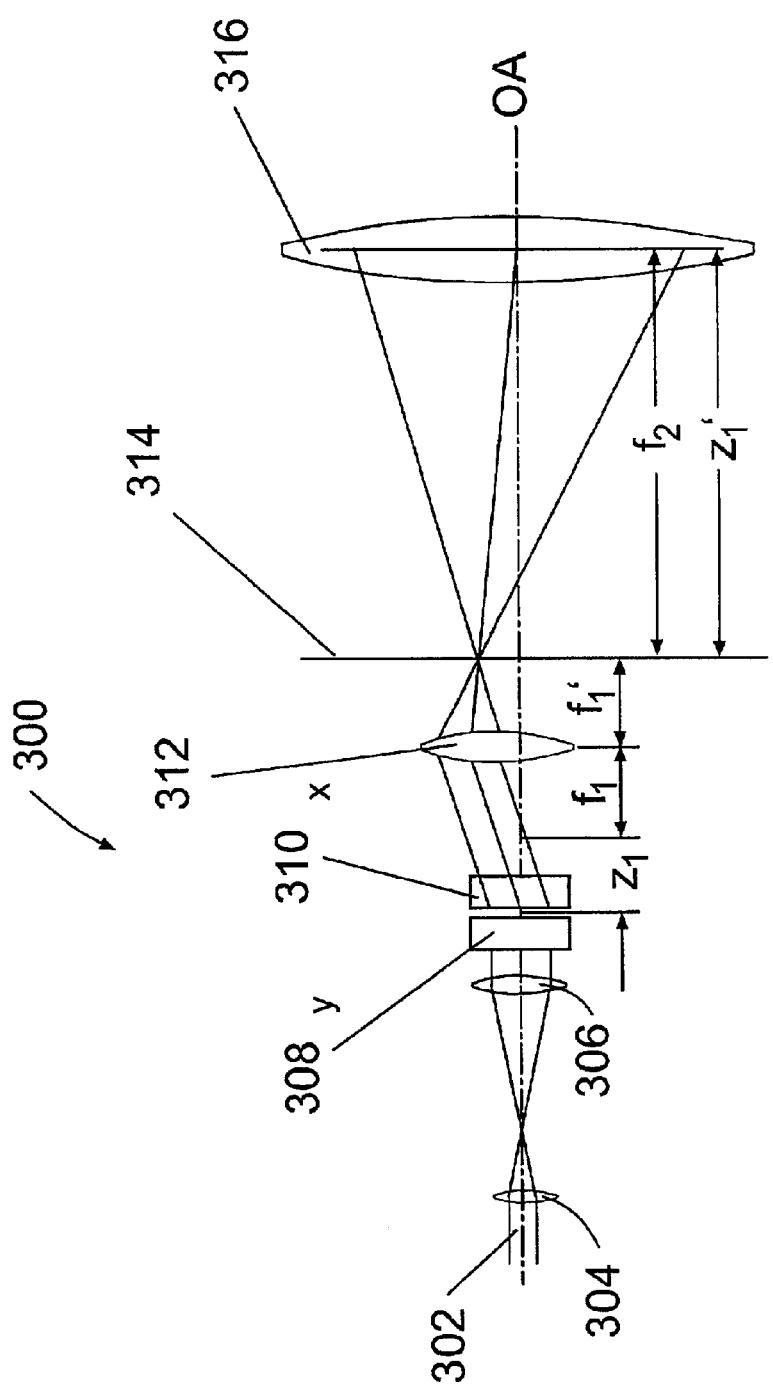
FIG. 7C is a diagrammatic elevational view of yet another embodiment of the invention in which two acousto-optic modulators (AOMs) in series are selectively modulated to provide desired illumination.

FIG. 7C is a diagrammatic elevational view of yet another embodiment of the invention in which two acousto-optic modulators (AOMs) in series are selectively modulated to provide desired illumination. As seen in FIG. 7C, this embodiment is diagrammatically shown as a system 300 which comprises an input beam 302 that is brought to focus on the optical axis by a converging lens 304. Beyond the focus following converging lens 304, the beam 302 diverges and then is collimated by collimating lens 306 after which it is fed to a pair of series arranged acousto-optic modulators 308 and 310. Upon emerging from acousto-optic modulator 310, beam 302 is refocused by an objective lens 312 to focal plane 314 after which it re-expands to serve as the input to a collimator lens 316. The output of collimator lens 316 then serves as the illumination or irradiation source for a downstream interferometer as before.

Acousto-optic modulators, 308 and 310, are arranged in series so that one of them deflects the transmitted beam in the zy-plane, and the other in the zx-plane. When both are synchronized and one is treated with a modulated signal according to $A \cdot \cos(2\pi v t)$ and the other according to $A \cdot \sin(2\pi v t)$, a circle with radius, r, is described at the focal plane 314 of the collimator lens 316. This radius r can be changed by the amplitude A of the modulation of the AOMs. When r is changed, the phase in the Fizeau interferometer is changed too, as described previously. The frequency, v, of the modulation can be synchronized with the frame rate of the camera, i.e. the time-constant $T=1/v$ can be made equal to the frame rate. In the case where T is chosen to be much less than the frame rate, the amplitude can be changed and within one frame rate lasting the total exposure time for the CCD-camera of $T_c$, ms, m different values for the amplitude A can be realized. These may be the values $A_1, A_2, \ldots A_m$, giving rise to the radii $r_1, r_2, \ldots r_m$ in the focal plane 314 of the collimator lens 316 and lasting for the time-periods of $T_1, T_2, \ldots T_m$, with the condition that $T_1+T_2+\ldots+T_m=T_c$. It will be evident that acousto-optic modulators 308 and 310 may be replaced with electro-optic modulators to provide similar functionality.

It is not necessary to use a strict point source in the scanning case since better results may be obtained in using a small spot, like a multimode fiber or a convergent or divergent beam slightly out of focus and falling onto a rotating ground glass.

For the realization of an extended, ring shaped light source, a convergent beam passing through an axicon or diffractive equivalent can provide an elegant solution as already mentioned. If the axicon or diffractive equivalent is shifted axially, the diameter of the ring is changed.

Figure 8:
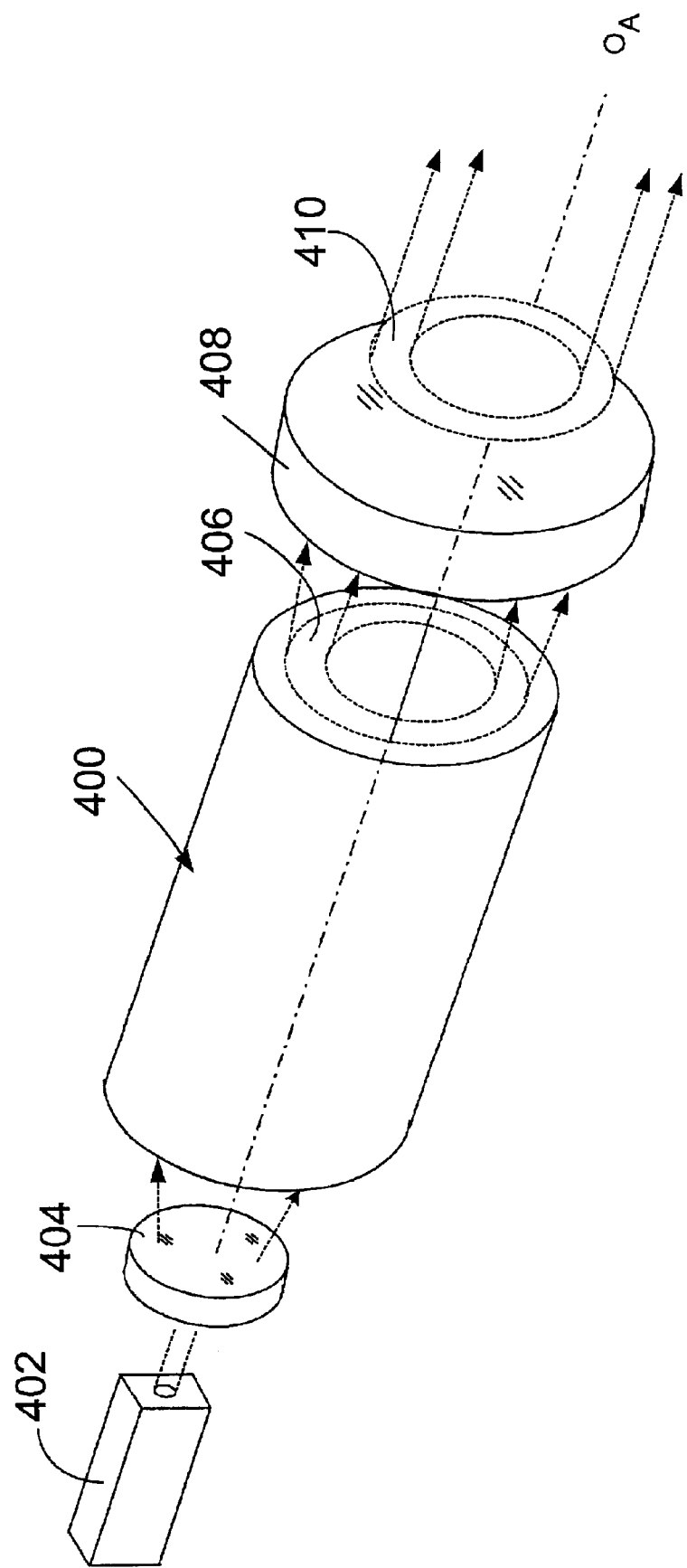
FIG. 8 is a diagrammatic perspective view of an embodiment of an inventive illumination system employing a multimode fiber excited by a source so that the output modal pattern of the fiber is in the form of a circular ring whose diameter may be changed by altering the angle of incidence of the excitation source.

Another solution is to use a fiber bundle, which has a circular entrance side but a ring shaped exit side. A multimode fiber properly excited by an entering source can be used to generate a ring source or ring source of variable radius. For such an arrangement reference may be had to FIG. 8 which shows multimode fiber 400 excited by a laser source 402 that is imaged onto the fiber's entrance facet via a lens system 404. Lens system 404 may be designed to control the angle of incidence and numerical aperture match to multimode fiber 400 so as to excite it in a well-known manner to generate a ring of illumination 406 that can thereafter be further controlled by following optics 408 to provide, for example, a collimated ring 410. The diameter of ring 406 may be selectively changed by varying, for example, the conditions under which the laser beam enters multimode fiber 400.

It will be noted that the geometry of the above-described interferometers may easily be altered to handle spherical surfaces as well by appropriately designing the lens responsible for controlling the shape of the incoming wavefront impinging on the object and reference surfaces.

Having described various structures for providing inventive thin and virtual rings that may have their radii dynamically changed either continuously or in stepwise fashion, it will be useful to review the range of possible inventive source configurations by referring now to FIG. 9 and the following table:

TABLE

| 1 Ring | Multiple Rings |
|---|---|
| Fixed Radius (FIG. 9a) | Fixed radius (FIG. 9c) |
| Variable Radius (FIG. 9b) | Variable Radius (FIG. 9d) |

It will be clear to those skilled in the art that multiple rings other than double rings may be used. In addition, it will be evident that the thickness of a thin ring, whether it be virtual or solid, may be readily determined with the use of Equation 1a and calculating when the phase shift created between the inner and outer diameters of the ring would exceed 180°, thus resulting in destructive interference. Consequently, the thickness should be made such that this phase shift is less than 180° by an amount that is consistent with the contrast requirements of the measurements being made. The nominal diameter of the smallest ring may be determined empirically and in general depends on wavelength, interferometer length, and the proximity of the source of the artifact to the surface under test. Generally, the closer the artifact source is to the test surface of interest, the larger will be the source diameter that is needed to suppress artifacts. If two or more rings are being used to alternately nullify and maximize contrast at different axial positions, the nominal ring diameters should generally be chosen so that the phase difference where high contrast is desired is small, and where low contrast is desired, is 180°.

From experimentation, ring diameters of 0.25 mm to 1 mm were found adequate to suppress the typical artifacts, principally from the vicinity of the beamsplitter in a breadboard interferometer, which was a based on the GPI Product of Zygo Corporation, Middlefield, Conn., U.S. From these results, a representative ring diameter of 1 mm has been found adequate, since this diameter did not impact on the design of a commercial collimator design used in the breadboard.

With regard to ring thickness, Equation (1a) can be used for the OPD to estimate the maximum allowable thickness as already mentioned where:

$$\Delta \approx 2\sqrt{L^2 + \left(\frac{d}{2f}L\right)^2} - 2L \approx \frac{L}{4}\left(\frac{d}{f}\right)^2 \quad (1a)$$

To find the thickness t such that the difference between the inner and outer diameters produces an OPD difference of $\lambda/2$.

$$\frac{L}{4}\left(\frac{d+t}{f}\right)^2 - \frac{L}{4}\left(\frac{d}{f}\right)^2 \leq \frac{\lambda}{2}$$

Solving for t we get $$t = \frac{\lambda f^2}{Ld}$$

Using a GPI focal length of 500 mm and assuming a wavelength of 600 nm and a maximum practical interferometer length of 3 m, a thickness of about 50 microns is found from the foregoing analysis. Note that this implies a lateral misalignment tolerance of half the thickness, about 25 microns.

While the foregoing off-axis illumination schemes and interferometric architectures are extremely effective in reducing the effects of coherent artifacts in normally configured interferometers, their use for this purpose in non-normally configured interferometric architectures containing retroreflective elements, for example, cat's eyes, is less efficacious. This is so because a point-source moved from the optical axis to a location off-axis in a non-normal cavity configuration results in one of the reflected waves traveling back to the original position (the wave, reflecting in the focus point of the transmission sphere), and the image of the light source is re-imaged onto its original position. The other wave reflects as from an ordinary mirror, and the image is opposite to the original position at the other side of the optical axis. Therefore tilt is introduced into the fringe system, and this tilt Is so strong, that the fringes cannot be resolved with the CCD-camera.

To understand how tilt fringes are introduced with an non-normal configuration, it will be useful to revisit what takes place within a normal configuration interferometer using off-axis illumination. When the incident plane wave enters the Fizeau-lens (see FIG. 6 for example) with an inclination angle, $\alpha$, to the normal of the optical axis, the case when a light source with a distance $y=f\tan(\alpha)$ off the optical axis of the collimating lens of the interferometer is used, the two plane waves, after reflecting at the spherical mirrors of the reference surface and the properly aligned test surface, both leave the Fizeau-lens with the same inclination angle of $-\alpha$. Thus, no tilt fringes are formed on the detector. The "object point" to be imaged by the two spherical mirrors is located off-axis by an amount $y_1=f_1\tan(\alpha_1)$, where $f_1$ is the focal length of the Fizeau-lens. Both image points are located opposite to the object points on the other side of the optical axis of the lens. They coincide because the magnification, $\beta$, of the imaging of a spherical mirror is independent of its radius of curvature when the object point is in the near vicinity of the center point of the sphere. Very weak aberrations are introduced by the small displacement from the true center point of the spherical surfaces, and these aberrations depend on the radii of curvature of the two spheres. Because of the differences in radii, they do not completely chancel and will, in principle, be visible in the resulting interferogram. But when the azimuthal position of the point source at the focal plane of the collimator is changed, i.e., when the point source describes one full circle with constant radius around the optical axis, the aberrations contained in the integrated interferogram are averaged to a zero-mean value because none of the different aberration terms (like coma and astigmatism, to name only the most prominent) are rotationally symmetrical.

Figure 10:
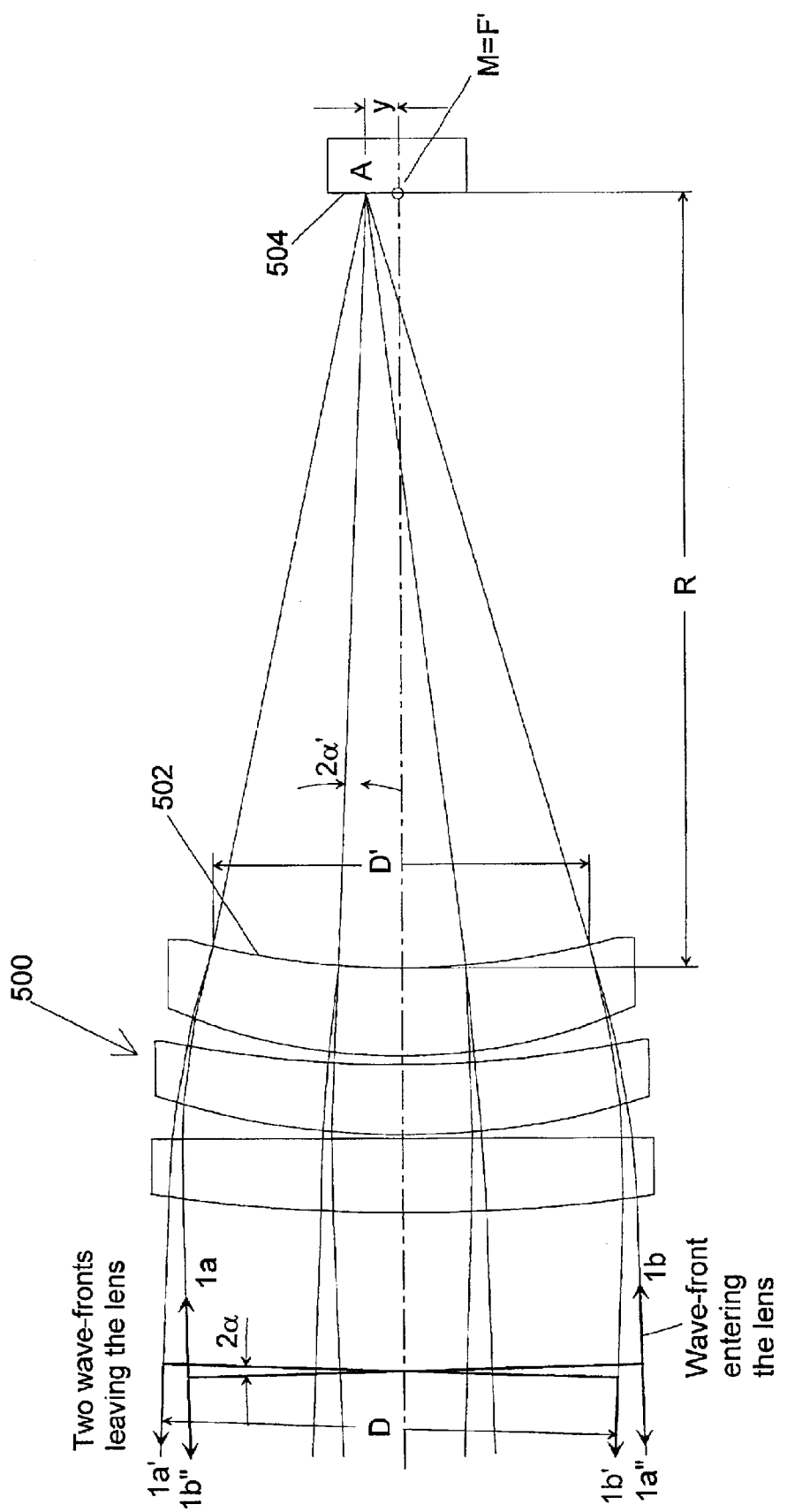
FIG. 10 is a diagrammatic elevational view illustrating the resulting wavefronts returned from a Fizeau interferometer having a retroreflective element in its cavity when illuminated with an inclined plane wavefront.

Having reviewed the operation of "normal use" of a Fizeau-lens in connection with the invention, the non-normal situation will now be discussed. This will be done by considering an arrangement which is used frequently in connection with a calibration procedure called the three position test. In this test, which is said to lead to an absolute knowledge of the spherical test surface, two of three measurements are done in the "normal" configuration as described above, whereas the third one uses the cat's eye configuration in connection with a normal reflection of the spherical wavefront at the spherical reference surface as illustrated in FIG. 10 and elaborated on later. Briefly though, the result of this test configuration is a so-called rotational shear interferogram, where the two interfering wavefronts are rotated by 180° with respect to each other. That is the wanted effect for this third configuration, to supply the necessary information for the absolute evaluation of the test-surface errors in connection with the other two measurements.

Reference is now made to FIG. 10 which shows non-normally configured cavity with a Fizeau lens (transmission sphere) 500 with an inclined incident plane wavefront $1a1b$ and resulting wavefronts $1a'1b'$ from reflection of the reference surface 502 and $1a''1b''$ from reflection from a cat's eye mirror designated generally as 504. Note the angle $2\alpha$ between the two wavefronts leaving the lens. When the plane wave incident on the Fizeau-lens 500 is inclined at an angle $\alpha$, the two waves reflected from the two surfaces are inclined by angles $-\alpha$ and $+\alpha$, therefore producing tilt fringes with a fringe spacing of $$d = \frac{\lambda}{2\sin\alpha},$$

where an interferogram with diameter D is situated immediately behind the Fizeau-lens. If the diameter of the interferogram on the CCD camera is $D_{CCD}$, then the fringe spacing on the camera is:

$$d_{CCD} = \frac{\lambda}{2\sin\alpha} \cdot \frac{D_{CCD}}{D}, \quad (13)$$

because the number of fringes remain constant when changing the diameter of the ray bundles. The result is that no useful interferogram is established because of the strong tilt between the two waves.

Figure 11:
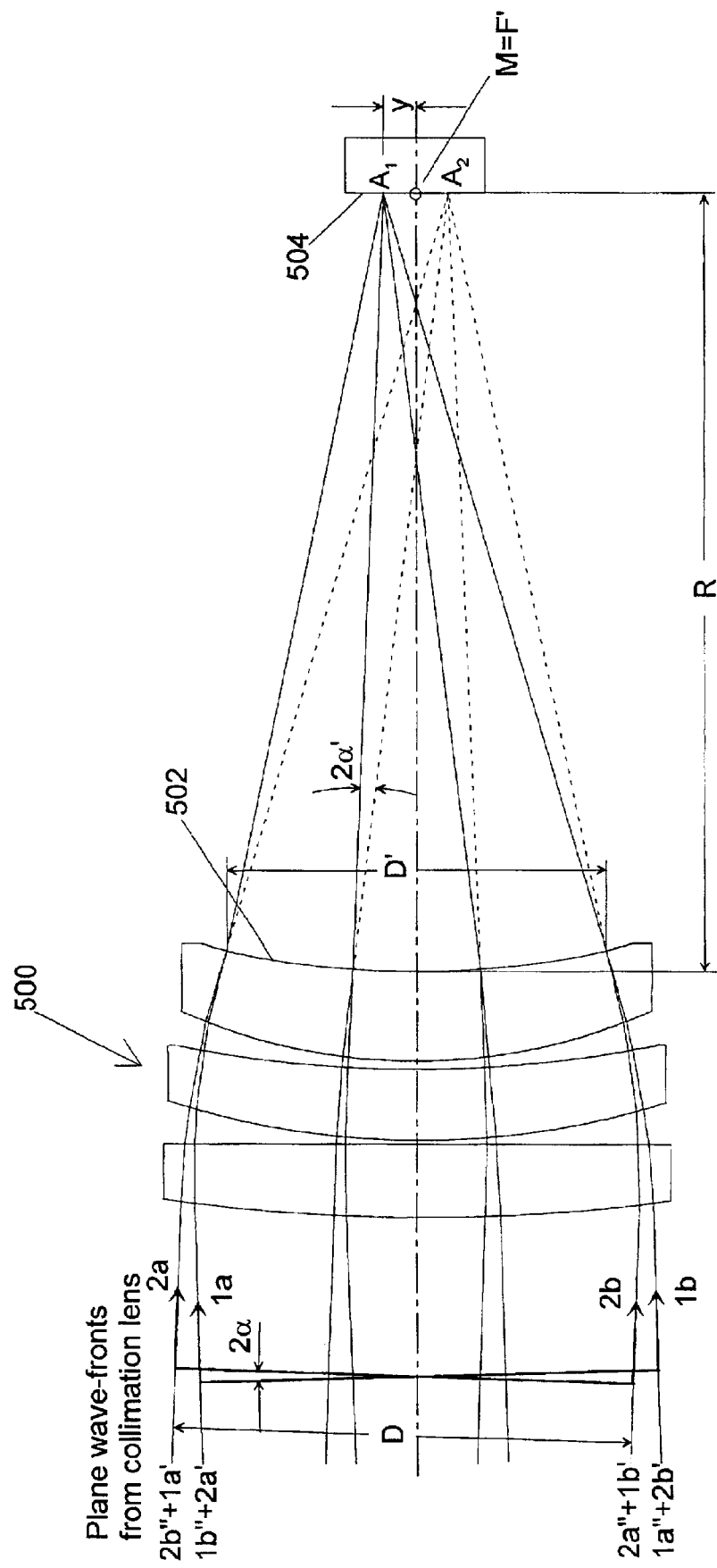
FIG. 11 is a diagrammatic elevational view illustrating the resulting wavefronts returned form the Fizeau interferometer of FIG. 10 when illuminated with a pair of oppositely inclined plane wavefronts.

The solution to this "cat's eye" problem is to use two coherent plane wavefronts with inclination angles of opposite sign to illuminate the non-normal Fizeau-lens simultaneously. This configuration is shown in FIG. 11. Here, two inclined coherent wavefronts $1a1b$ and $2a2b$ illuminating the Fizeau-lens leads to two wavefronts $1b''1a''$ and $2a'2b'$ which are not inclined to each other and another two wavefronts $2b''2a''$ and $1a'1b'$ with are also not inclined to each other and therefore lead to useful interference-fringe systems without tilt fringes. These two-wave interferences stem in both cases from the phase-difference between the reference surface and the cat's eye wavefront. In addition, both two-wave-systems produce very fine interference fringe systems as before, since they are inclined at an angle $2\alpha$ to each other and coherent with each other.

It is shown by FIG. 11 that, in addition to the two useful fringe systems with no tilt-fringes, there is an additional fringe system with the same high-density tilt fringes as before. This second fringe system can be smeared out when the fringes are rotated by 360° during the integration time for one camera frame (i.e. during about 30 ms). Note, that the useful interference pattern is not rotated when the plane containing the inclination angles of the in bouncing waves rotate azimuthally with the optical axis being the axis of rotation.

Figure 12:
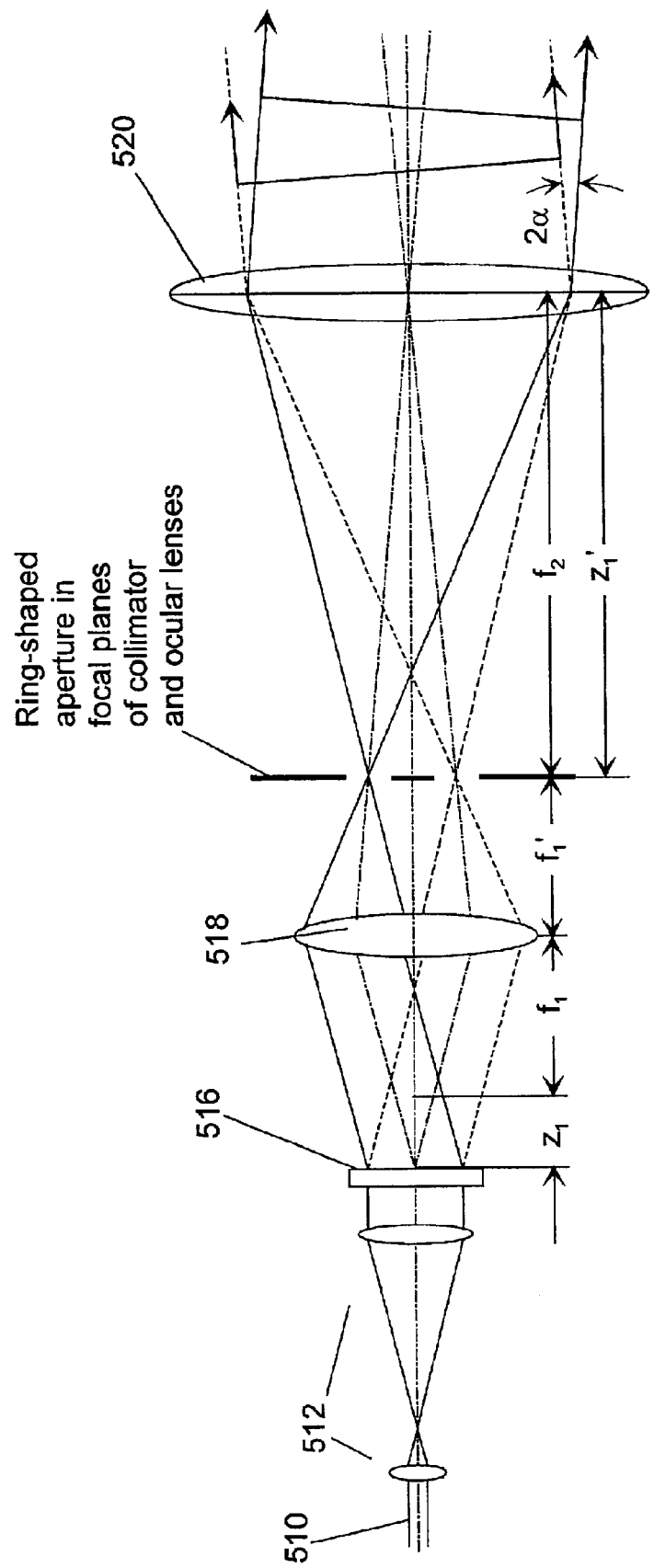
FIG. 12 is an embodiment of the invention in which a rotating grating generates inclined wavefronts of the type illustrated in FIG. 11.
Figure 13:
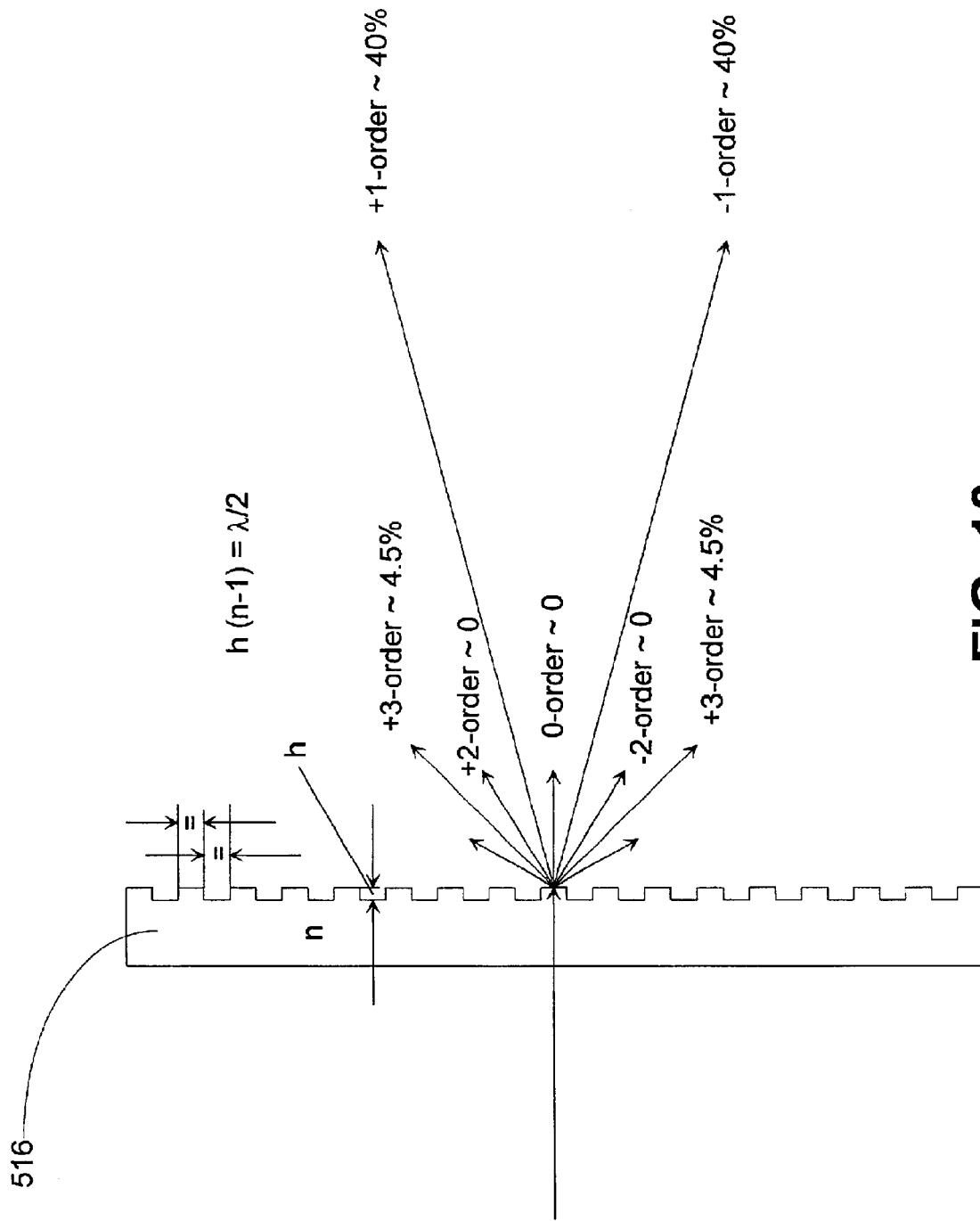
FIG. 13 is a diagrammatic elevational view of a phase grating used in the embodiment of FIG. 12.

There are a number of ways by which two inclined coherent wavefronts can be produced. One preferred embodiment is shown In FIG. 12. In FIG. 12, the coherent plane wavefront from a laser 510 is expanded by a beam expander 512 and then impinges on a rotating phase-grating 516. When grating 516 is shown in FIG. 13, all even diffraction orders will be very weak, giving rise to about 40% of the energy within the first and minus first order. Grating 516 is located behind an afocal system consisting of an "ocular lens" 518 with focal length f1 and a "collimator lens" 520 with focal length f2, known as a "Kepler telescope". In the common focal plane of both lenses, it is possible to introduce a physical aperture (glass-plate with a chromium layer forming a ring-shaped aperture) to block spurious orders of diffraction grating 516.

It is possible to image the diffraction grating 516 with this configuration. In FIG. 12, the image is located near the collimator lens 520; but if the distance $z_1$ is changed, the location of image of grating 516 is also changed and another location can be chosen, for instance the location at the reference surface of the Fizeau-lens, see FIG. 11. This change in distance of $z_1$ does not alter the location of the ring-shaped aperture behind the ocular lens 518. The diffraction grating 516, again, is shown in FIG. 13.

Figure 14:
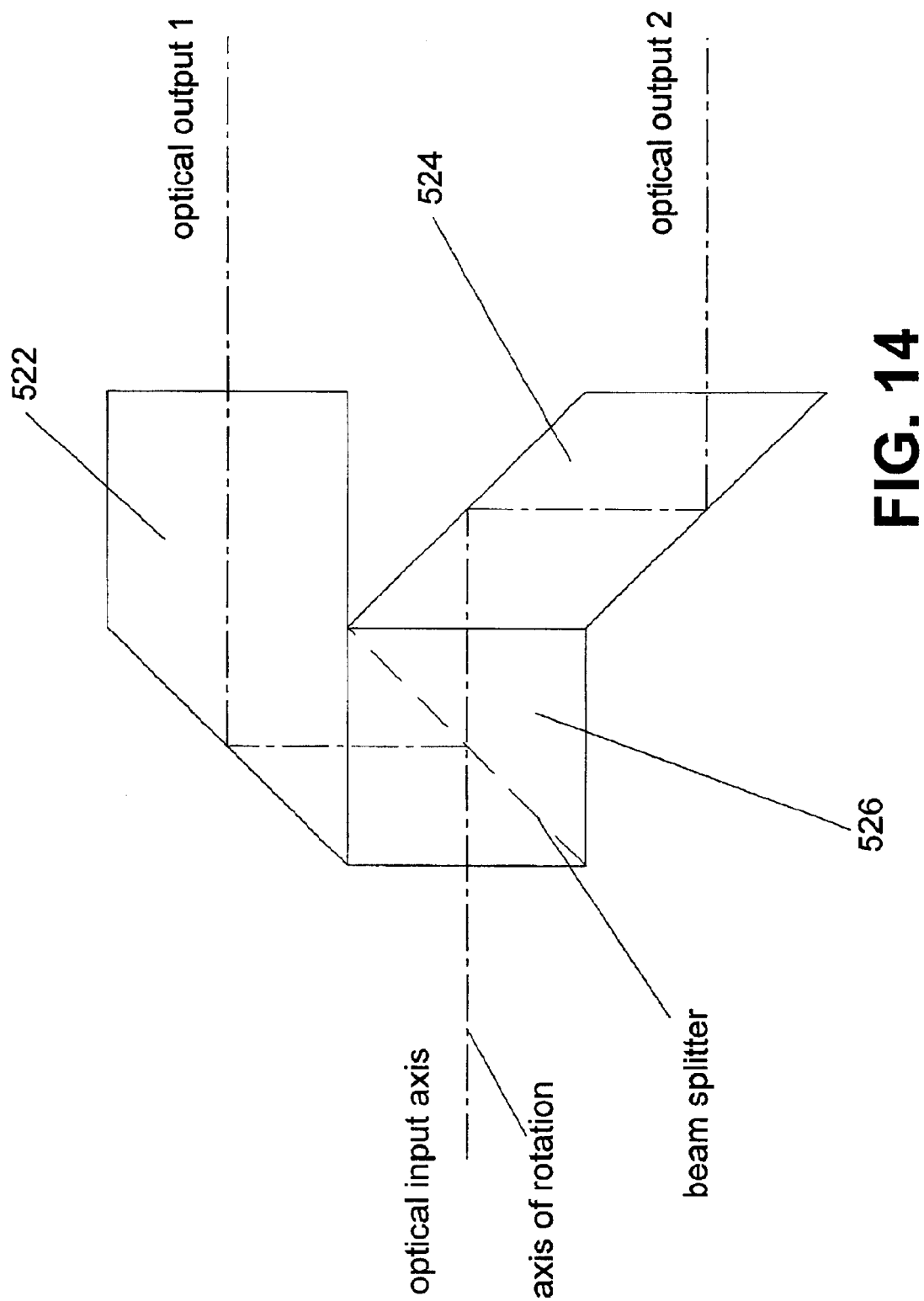
FIG. 14 is a diagrammatic elevational view of an alternate embodiment for providing oppositely inclined wavefronts through the use of a beam splitter and associated.

Another embodiment for producing two symmetrically located points is shown in FIG. 14 which shows prismatic elements 522 and 524 attached to the output facets of a beamsplitter 526 to generate two oppositely located point sources that travel over identical optical path lengths.

Figure 15:
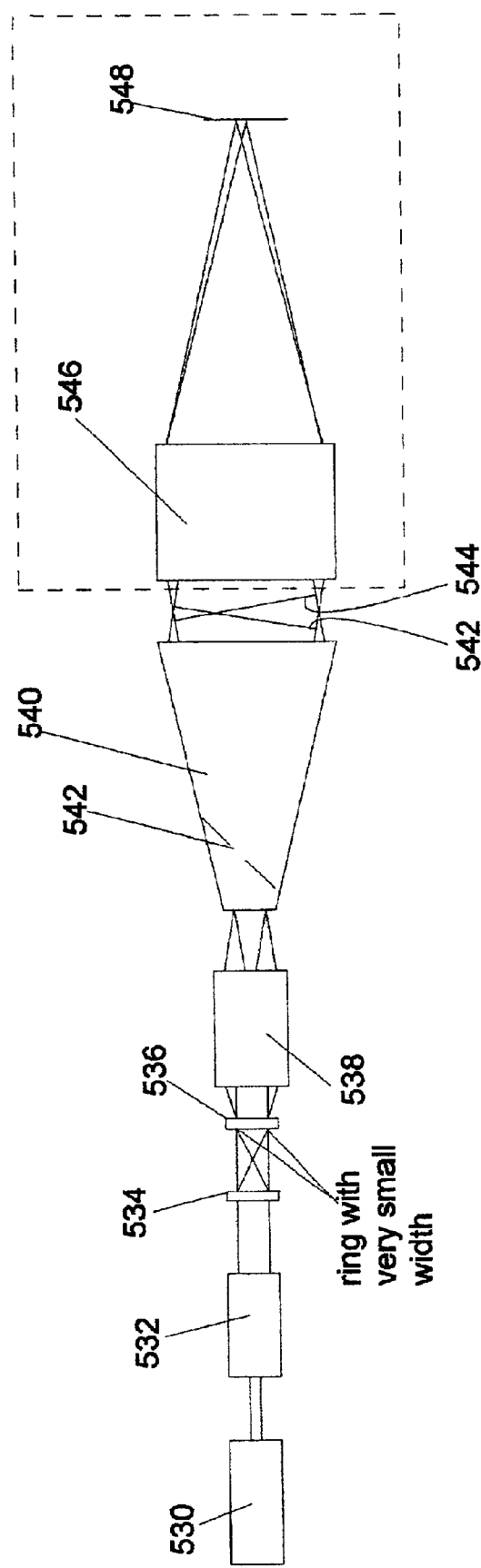
FIG. 15 is a diagrammatic elevational view of an interferometer system of the invention employing a rotational shearing interferometer.

FIG. 15 shows yet another embodiment for generating two coherent plane wavefronts tilted symmetrical to the optical axis by means of using a rotational shearing interferometer. As mentioned earlier, a rotating grating must be adjusted very precisely to introduce no phase-changes between the two diffraction orders used during rotation. With a holographic element that produces a ring of a very high number of sources, together with the rotation of a ground glass to make these sources mutually incoherent, the holographic element is a flip-in device which is not critical to adjust and the ground glass need not be adjusted laterally at all; its axis of rotation being arbitrary. Another approach is to include a rotational shearing interferometer as a device that is able to produce, in addition, an identical copy of the wavefront, but rotated by 180° with respect to the original position. As shown in FIG. 15, a laser 530 undergoes beam expansion via expander 532. The expanded beam is received by a holographic device 530 to produce a ring, which is received by a rotating ground glass 536 to make all points of the ring incoherent to each other. A rotational shearing interferometer 538 (RSI) produces two identical copies (same dynamic of phase changes) of the wavefront from the rotating ground glass 536, but rotated with respect to each other by 180°. Afterwards, a beam expander 540 comprising an ocular and a collimator lens (neither shown) enlarges the two tilted wavefronts. A beamsplitter 542 is provided in the beam expander for directing returning wavefronts to a CCD device (not shown). Two coherent plane tilted wavefronts 542 and 544 emerge from the beam expander 540 and enter a transmission sphere 546 with a confocal reference surface. The cat's eye mirror is designated at 548. As a consequence of this structure the deleterious effects of tilted wavefronts with a cat's eye configuration also are ameliorated.

Figure 16:
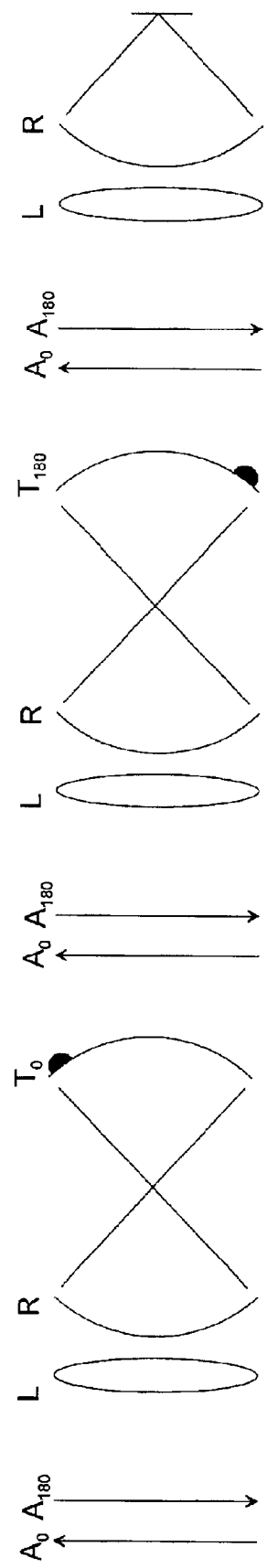
FIGS. 16A, 16B, and 16C are diagrammatic representations used to introduce the meaning of various terms used in mathematical relationships appearing in the detailed description.

Let the two wavefronts generated by the shearing interferometer 538 be designated as $A_0$ and $A_{180}$ (See FIG. 16C). If both wavefronts enter the Fizeau transmission sphere, which is used in the cat's eye position, the following wavefronts are produced:

$B_0$ from the reference surface and $B_{180}$ from the cat's eye surface out of $A_0$ $B_{180}$ from the reference surface and $B_0$ from the cat's eye surface out of $A_{180}$ Now it is possible that the two wavefronts $B_0$ as well as the two wavefronts $B_{180}$ interfere with each other in macroscopic resolvable, coherent interferograms because the microstructures of the wavefronts are correlated.

But now both partners for the interference stem from different illumination wavefronts. That means the device that produced $A_0$ and $A_{180}$ may introduce different aberrations into these wavefronts. Therefore, it is necessary to re-investigate the procedure for absolutely measuring the wavefront of the test surface with the inclusion of $A_0$ and $A_{180}$.

For the investigation of the equations, a very simplified, schematic version of the arrangement is used, where sources of errors are summarized in a very small number of terms. The three measurements performed are expressed with terms introduced in FIGS. 16A through 16C, showing schematically the three measurements.

Let the three wavefronts measured $W_1$, $W_2$ and $W_3$. The errors which are included in the measurements are expressed by the following three equations, Eqs. 14, 15, and 16. For clarity, the distinction is made between a reference wavefront and a test wavefront here, which are finally subtracted from each other. Terms, which are common to both wavefronts, are first expressed twice, before they are cancelled with each other. Also, the following abbreviations are used:

$A_0$ Phase-map introduced by the ground glass+the errors of the RSI for the first arm $A_{180}$ Phase-map of ground glass in rotated pos.+the errors of the RSI for the second arm $L_0$ WEF caused by the lens in single transmission in initial position $L_{180}$ WFE caused by the lens in single transmission in rotated position $T_0$ WEF caused by the test surface in reflection in initial position $T_{180}$ WEF caused by the test surface in reflection in rotated position $R_0$ WEF caused by the reference surface in reflection in initial position $R_{180}$ WEF caused by the reference surface in reflection in rotated position $$W_1=[(A_0+2L_0+R_0)-(A_0+2L_0+T_0)]+[(A_{180}+2L_0+R_0)-(A_{180}+2L_0+T_0)] \quad (14)$$

$$W_2=[(A_0+2L_0+R_0)-(A_0+2L_0+T_{180})]+[(A_{180}+2L_0+R_0)-(A_{180}+2L_0+T_{180})] \quad (15)$$

$$W_3=[(A_0+2L_0+R_0)-(\overline{A}_{180}+L_0+L_{180})]+[(A_{180}+2L_0+R_0)-(\overline{A}_0+L_0+L_{180})] \quad (16)$$

The bar above the $A_{180}$ and above the $A_0$ in $W_3$ means, that the wavefronts are rotated by the cat's eye configuration. But, because the first rotational shear interferometer might introduce its own errors in the two different legs, you don't end up automatically with the original wavefront after two subsequent rotations in two interferometers in a row, i.e. $A_0 \neq \overline{A}_{180}$. This equation would only be true for the question of the spatial coherence function, because the microstructures match again after two rotations.

For the final evaluation, two of the measured wavefronts are rotated by software by 180°. This is again denoted by a bar above the wavefronts. We rotate $W_2$ and $W_3$.

$$\overline{W}_2=[(\overline{A}_0+2L_{180}+R_{180})-(\overline{A}_0+2L_{180}+T_0)] \\ +[(\overline{A}_{180}+2L_{180}+R_{180})-(\overline{A}_{180}+2L_{180}+T_0)] \quad (17)$$

$$\overline{W}_3=[(\overline{A}_0+2L_{180}+R_{180})-(A_{180}+L_0+L_{180})]+[(\overline{A}_{180}+2L_{180}+R_{180})-(A_0+L_0+L_{180})] \quad (18)$$

As with the original algorithm (Jensen and Schwider), the following equation is used for the extraction of the test surface errors T:

$$T = \frac{1}{4}(W_3 + \overline{W}_3 - W_1 - \overline{W}_2) \quad (19)$$

The validity of the result can be proven by substituting the terms given in equations (14) to (18) into equation (19). That means, that the correct results are still gained for the absolute test procedures of spheres in the case with an additional rotational shear interferometer introduced in the test-set-up.

Figure 17:
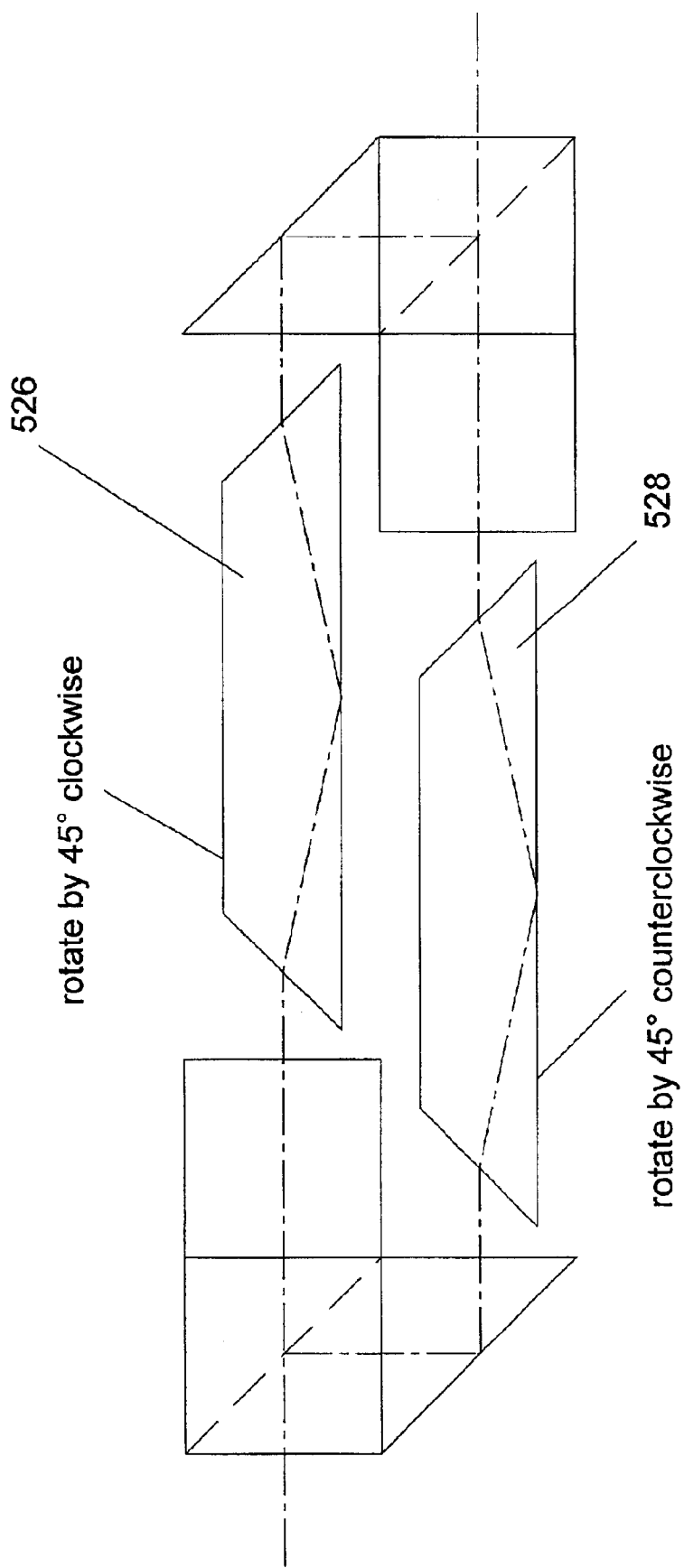
FIG. 17 is a diagrammatic elevational view of another alternate embodiment for providing oppositely inclined wavefronts through the use of a rotational shear interferometer implemented with a pair of Dove prisms.
Figure 18:
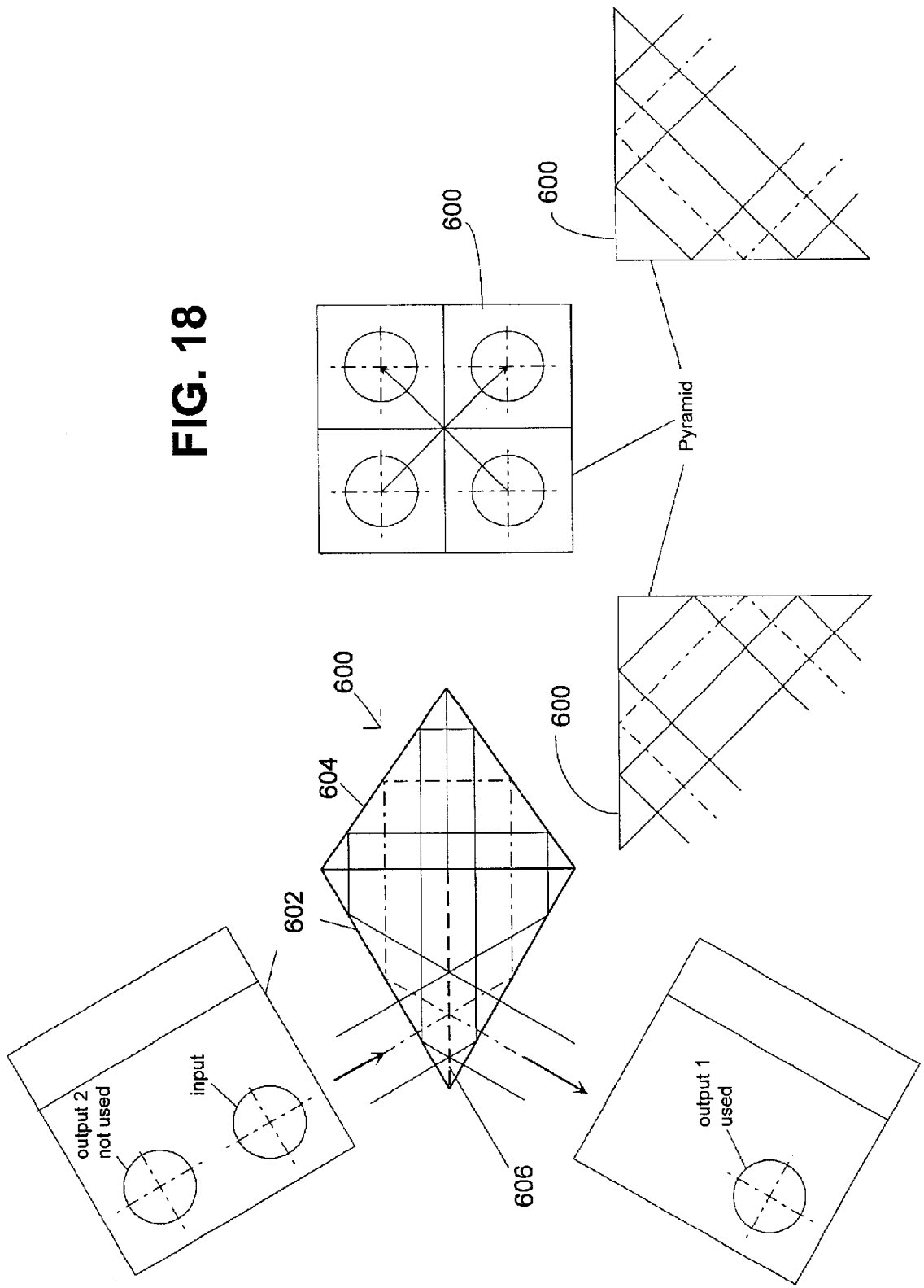
FIG. 18 is a diagrammatic elevational view of construction details of Koester's prism and a quadratic pyramid as a rotational shear interferometer.
Figure 19:
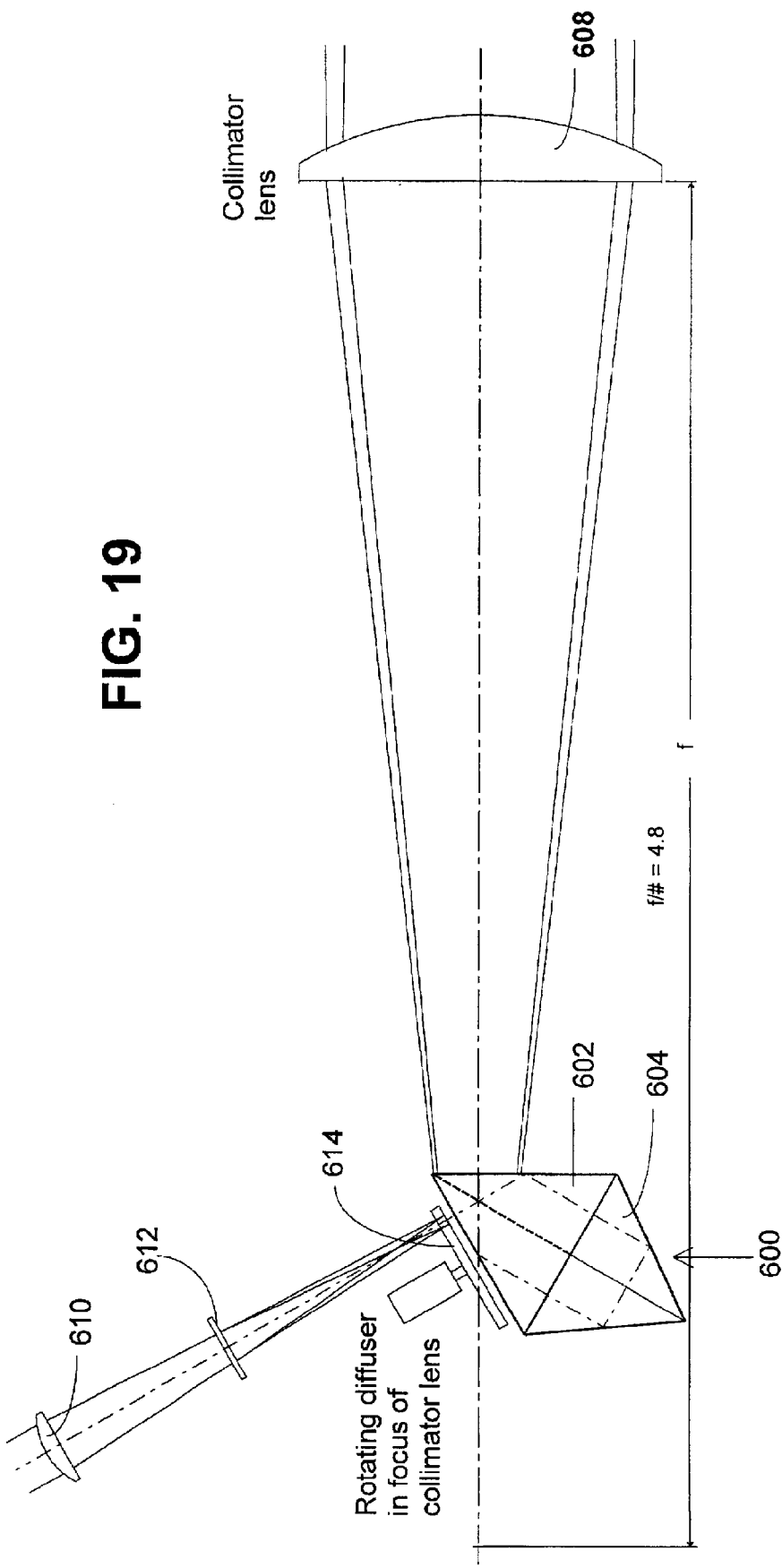
FIG. 19 is a diagrammatic elevational view of an embodiment of a rotational shear interferometer having 180° of rotational shear with a Koester's prism together with a quadratic pyramid as shown in FIG. 18.

The rotational shearing interferometer 538 may be realized in a number of ways. FIG. 17, for example, illustrates a rotational shear interferometer in which Dove-prisms are oppositely rotated by 45° to generate two symmetrically located points. Another solution for this task is shown in FIGS. 18 and 19, where a new type of rotational shear interferometer is shown, which is made of only three pieces of glass. It is a symmetrical design, somewhat similar to a Sagnac interferometer, but it is not really cyclic. Therefore, the errors introduced in the two legs may differ and do not automatically cancel. The bundle enters a Koester's prism, is split into two halves and both are then reflected by a prism 604 made as a four-sided pyramid. The beams now leave their original plane; that is, where a rotation of both beams by 90° is introduced. The final relative rotation of the beams is the sum of those two rotations, i.e., 180°. After that reflection on the two mirrors of the pyramid, each of the beams enters the Koester's prism 602 again, and they are finally recombined by a beamsplitter. They leave the prism 604 at another height and on the other side of the Koester's prism 602.

In FIG. 19, the use of such a rotational shear interferometer in an interferometer mainframe is shown. Here, a focusing lens 610 converges an input beam to a holographic element 612 to produce a ring. The ring then encounters a rotating diffuser 614 located at the focus of the collimator lens 608, and then enters the Koester's prism 602, after which it is treated as described above. It is obvious from FIG. 19 that a change in the direction of the incident bundle by 60° is encountered; but the change in height is not visible in FIG. 19.

Figure 20:
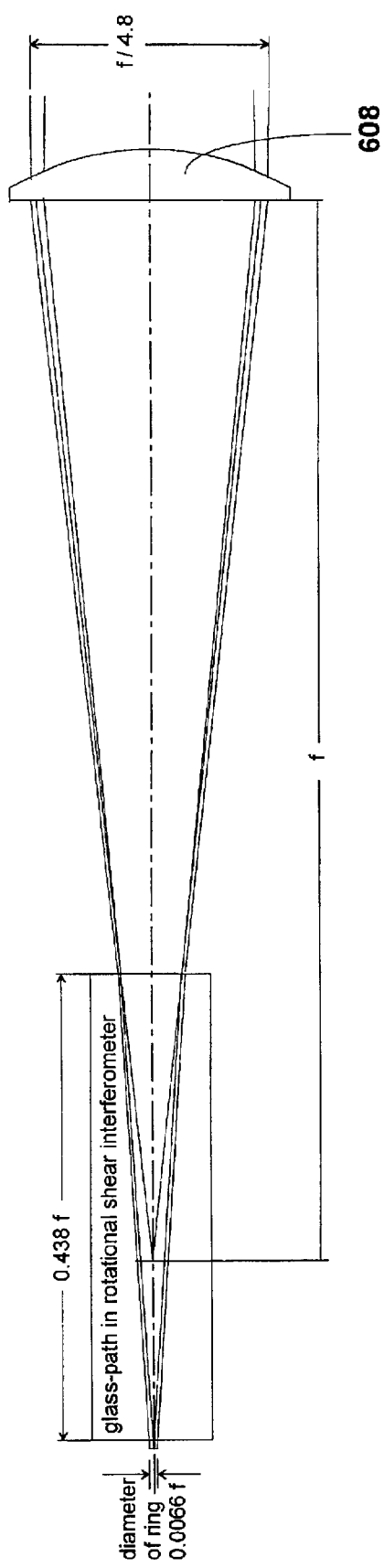
FIG. 20 is a diagrammatic elevational view of the unfolded light path through Koester's prism and quadratic pyramid of FIG. 18.

In order not to increase the construction length of such a mainframe by the use of the rotational shear interferometer, it is advantageous to introduce the device in the diverging beam before the collimator lens 608. This is possible because of the complete symmetry in path-length in both arms. The path-length in glass is considerable, which is made clear in FIG. 20. In the case, which is assumed for the drawings, the path-length in glass is about 44% of the focal length of the collimator 608, which is believed to be a typical value. In any case, the thick plane parallel plate made of glass must be considered for the optical design of the collimator lens 608. It should be noted, that the optical arrangement of FIG. 19 differs slightly from the arrangement in FIG. 15.

Another possible way to realize two wavefronts with pairs of coherent sources with the same phase on opposite sides with respect to the optical axis involves the use of a scatterplate. The basic procedure for making a scatterplate is to expose a photographic plate to a speckle pattern produced by illuminating a piece of ground glass with a laser beam. Since the scatterplate must have inversion symmetry, two superimposed exposures to the speckle pattern must be made, where the plate is rotated 180° between the exposures. To ensure that the scatterplate illuminates the surface under test as uniformly as possible during the making of the scatterplate, the solid angle subtended by the illuminated piece of ground glass, as viewed from the photographic plate, should be at least as large as the solid angle of the surface under test viewed from the scatterplate during the test. After development, the photographic plate should be bleached to yield a phase scatterplate. The exposure, development, and bleaching should be controlled so that the scatterplate scatters 10% to 20% of the incident light. For present purposes, the scatterplate should be illuminated by the ground glass for production with a numerical aperture larger than that used in the collimator lens, and the exposure, development and beaching should be done such that the highest amount of scattered light is reached, and the two exposures should be done in the original holder, which inherently contains a high precision bearing for rotation. Thus, the optical center coincides automatically with the mechanical center of the scatterplate.

Figure 21:
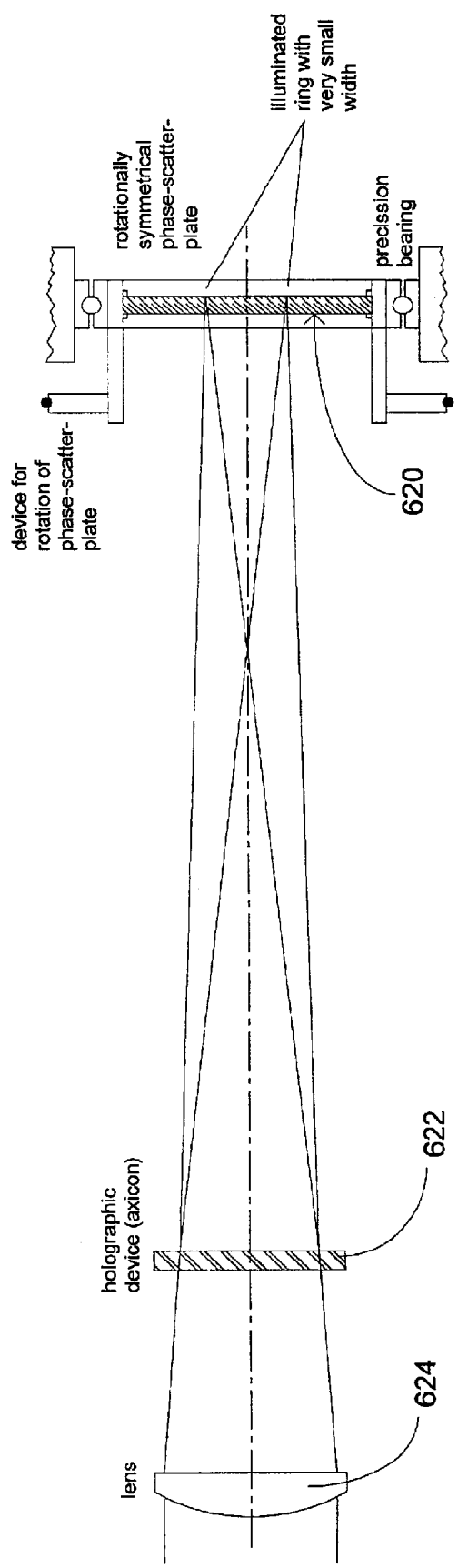
FIG. 21 is a diagrammatic elevational view of a very simple arrangement producing two identical wavefronts rotated by 180° with respect to each other through the use of a special phase-scatter-plate which is mounted and rotated in a high precision bearing.

To use the scatterplate, an arrangement as shown in FIG. 21 is made. The only alignment needs are to align the holder of the scatterplate 620 with respect to the optical axis, which is defined by the apex of the lens 624 and the symmetry center of the holographic device 622.

A solution to the problem using a holographic axicon together with a rotating, rotational symmetric scatterplate would also be very elegant because these two devices do the job of a normal holographic device producing a ring of light-sources with random phase, a normal rotating diffuser, and a rotational shearing interferometer.

There are other ways to produce two points located symmetrical in opposite positions to the optical axis in the focal plane of the collimator lens. For instance, a Wollaston prism could be used together with quarter-wave plates. In addition, it is possible to use a disk with two oppositely spaced clear apertures, but this would not make efficient use of available light.

It should be noted that it may be useful to produce more than two coherent points at a time. This can be done with special holographic elements. For instance, the pattern of points of FIG. 22 in the common focal plane of FIG. 15 might be very useful. If such a configuration of 6 illumination points is used, the rotation speed of the element can be reduced by a factor of three, which might be important to avoid high-speed motors and bearings. The unwanted interference fringe systems are coarser in this case, but only by a factor of two compared to the two-point system of the grating 516 from FIG. 13, which is still adequate. It can be argued that even a higher number of points on the circle might be feasible because the unwanted interference systems will rotate, and therefore, be washed out in the average. But coherent points too close in FIG. 22 produce coarser fringe systems, and a noise component is introduced into a waveband of spatial frequencies where the useful information to be measured is also located. This should be avoided in high precision measurements.

Figure 22:
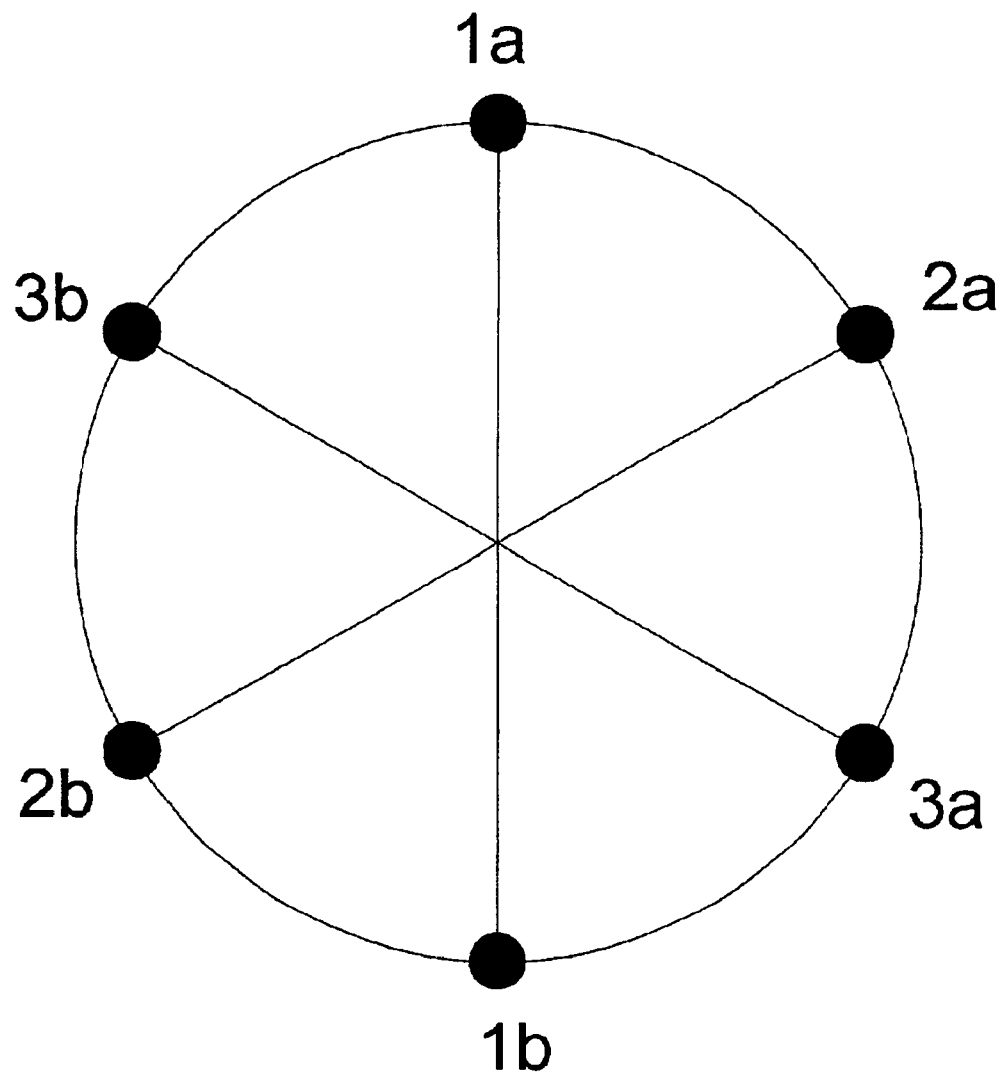
FIG. 22 is a diagrammatic front view showing a pattern of illumination points produced simultaneously by a holographic diffraction element.
Figure 23A:
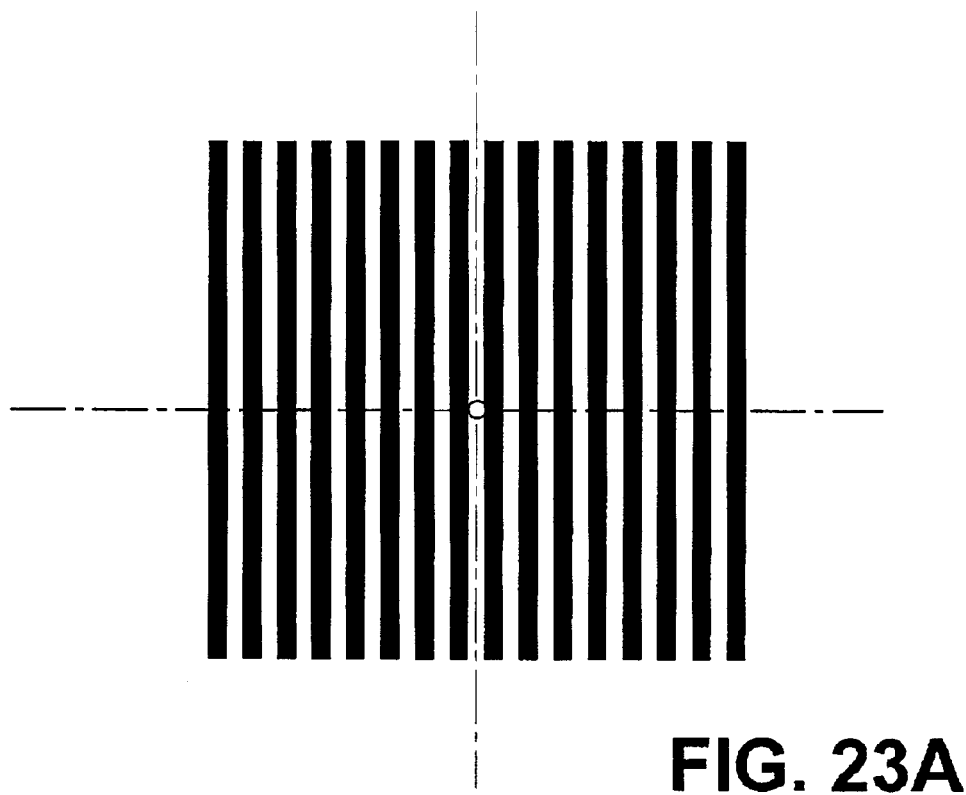
FIGS. 23a–23d are diagrammatic views illustrating good and poor practices for placement of the axis of rotation of the grating used in invention.
Figure 23B:
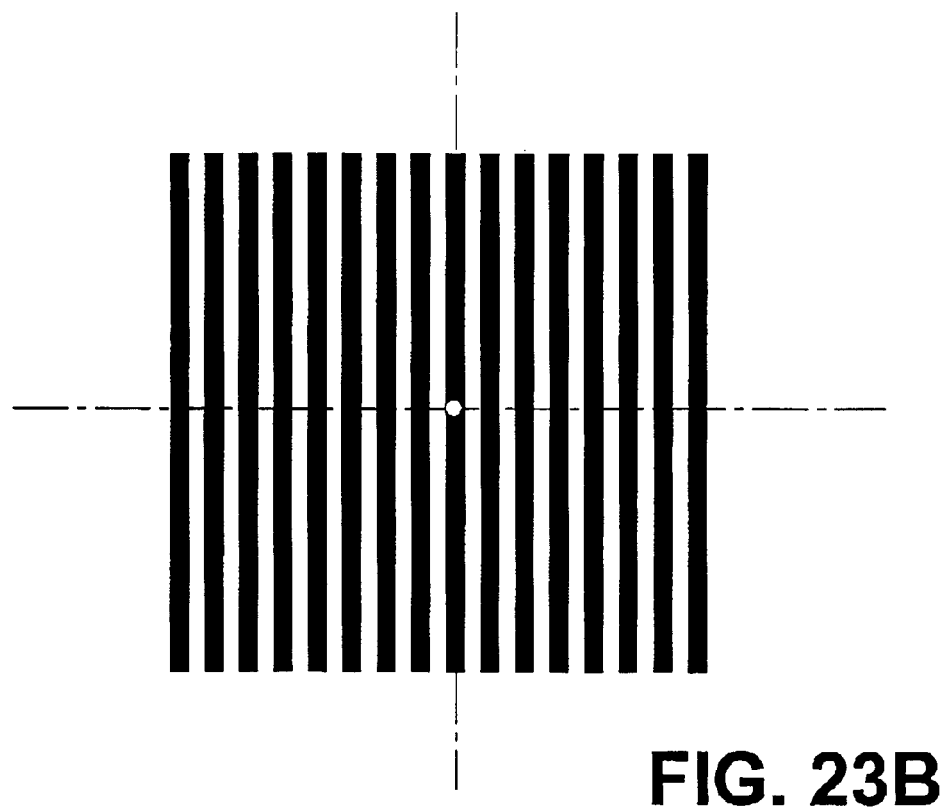
Figure 23C:
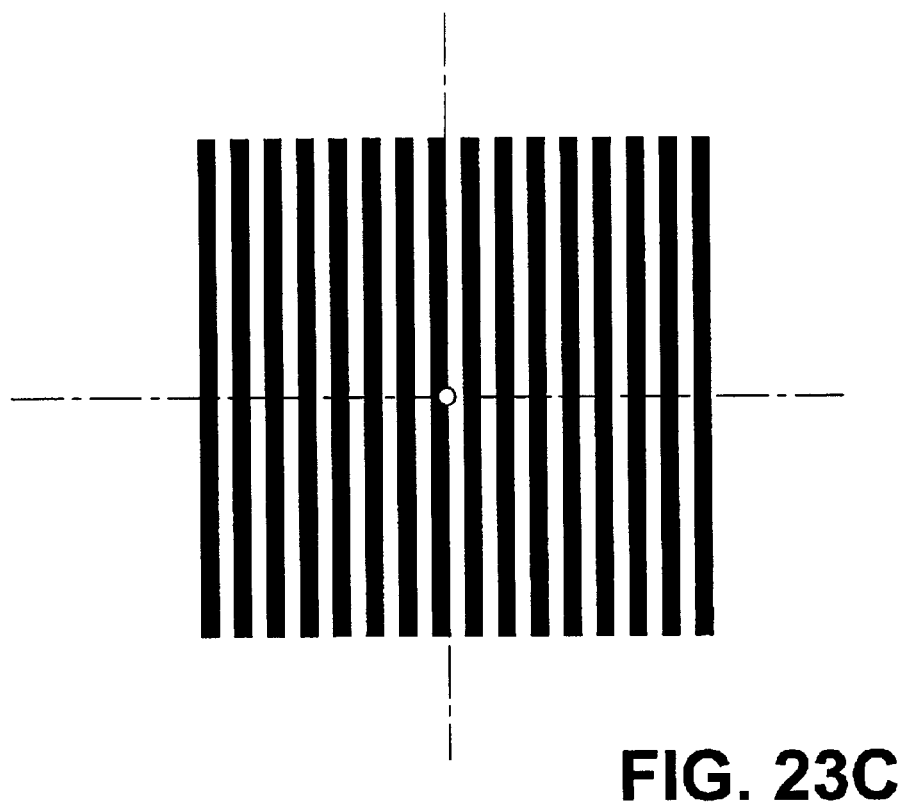
Figure 23D:
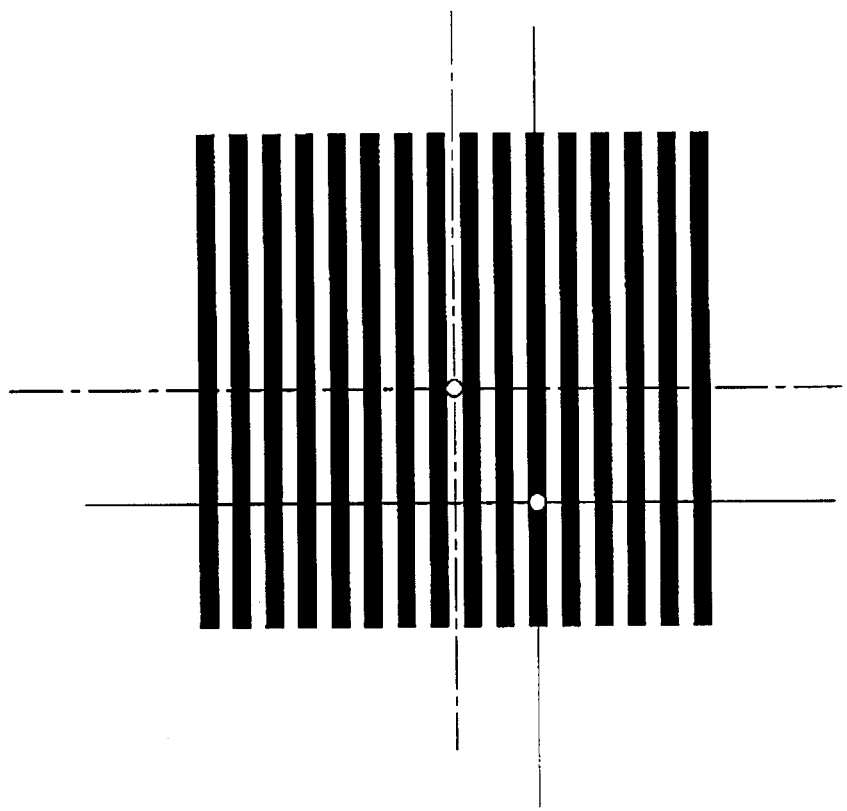

In FIGS. 23a to 23d, it is shown that the axis of rotation for the grating of FIG. 13, or the holographic device of FIG. 22, should precisely coincide with the middle of a grating period, where the grating is located with respect to the axis so that it is an "even function" (cos-like, not sin-like), in order not to introduce a phase-term in its Fourier transformation. FIGS. 23a and 23b show possible acceptable locations for the rotation axis of the grating; FIG. 23a shows the rotation axis coincident with the optical axis while FIG. 23b shows another possibility. FIG. 23c shows an impossible location for the rotation axis because it introduces a phase shift of $2\pi$ between the coherent beams when the grating is rotated by 180°. FIG. 23d shows a case where there is a severe phase shift of $5 \times 2\pi$ where the axis of rotation is off by 2.5 lines of the grating from the optical axis. The useful interference systems here are washed out when the integration time is chosen to be equal to the time of one revolution of the grating.

In view of the foregoing, it should be apparent that the use to at least two oppositely spaced off-axis points of illumination, while solving the tilted fringe problem introduced by a retroreflector in the interferometric cavity, also may be used beneficially with normal interferometer architectures to reduce the effects of coherent artifacts.

It should be mentioned that the invention is not restricted to the case of Fizeau interferometers, but can be applied with all other kinds of interferometers including, but not limited to, unequal path types such as the Mirau and Twyman-Green. The principle underlying the invention can equally be applied to the testing of spheres. In addition, use may be made of one or more beam steering mirrors driven by galvanometers or the like in place of rotating wedges.

Other changes will be obvious to those skilled in the relevant field based on the teachings and embodiments of the invention described herein and such changes are intended to be within the scope of the invention as claimed.

What is claimed is:

1. Apparatus for illuminating an object under test in an interferometer having an optical axis, said apparatus comprising:

at least one source of radiation; and means for directing radiation from said source at the object from different locations that are distant from the optical axis such that radiation from said locations is incident to the same points on the object along optical paths having substantially identical optical path differences within the interferometer.

2. The illumination apparatus of claim 1 wherein said different locations comprise at least two that are equidistant from the optical axis, oppositely spaced along an azimuth through said optical axis, and wherein radiation therefrom is mutually coherent.

3. The illumination apparatus of claim 2 wherein said means for directing radiation from said source comprises a diffraction grating mounted for rotation about said optical axis.

4. The illumination apparatus of claim 2 wherein said means for directing radiation from said source comprises a holographic element mounted for rotation about said optical axis.

5. The illumination apparatus of claim 2 wherein said means for directing radiation from said source comprises a beam splitter and two prismatic elements coupled, respectively, to two different facets of said beam splitter, said beam splitter and said prismatic elements being mounted for rotation about said optical axis.

6. The illumination apparatus of claim 2 wherein said means for directing radiation from said source comprises a rotational shearing interferometer.

7. The illumination apparatus of claim 6 wherein said rotational shearing interferometer comprises a pair of oppositely rotated Dove prisms.

8. The illumination apparatus of claim 2 wherein said means for directing radiation from said source comprises a disk having a pair of oppositely spaced dear apertures and mounted for rotation about said optical axis.

9. The illumination apparatus of claim 1 wherein said distant locations from which radiation is directed toward an object are equidistant from said optical axis.

10. The illumination apparatus of claim 9 wherein said equidistant locations lie in a plane substantially perpendicular to the optical axis.

11. The illumination apparatus of claim 1 wherein said radiation from each of said locations is directed toward the object at substantially the same time.

12. The illumination apparatus of claim 1 wherein said radiation from each of said locations is directed toward the object at different times during a predetermined time period.

13. The illumination apparatus of claim 12 further including a detector having a capture period and wherein said predetermined time period is no more than said capture period of said detector.

14. The illumination apparatus of claim 1 wherein said source for generating radiation comprises a point source and wherein said radiation directing means comprises an arrangement for rotating said point source around said optical axis at a predetermined rate such that radiation emanating from said point source appears to be originating from said two different locations.

15. The illumination apparatus of claim 14 wherein said radiation directing means comprises at least one rotating wedge.

16. The illumination apparatus of claim 14 wherein said radiation directing means comprises a pair of serially arranged rotating wedges. radiation directing means comprises a pair of serially arranged rotating wedges.

17. The illumination apparatus of claim 14 wherein said radiation directing means comprises a beam splitter mounted for rotation in one azimuth and a wedge mounted for rotation in another azimuth.

18. The illumination apparatus of claim 14 wherein said radiation directing means comprises serially arranged mirrors, one mounted for rotation in azimuth and the other for rotation in elevation.

19. The illumination apparatus of claim 1 wherein said radiation directing means comprises optical components structured to selectively image said source at different distant locations around said optical axis at different times.

20. The illumination apparatus of claim 1 wherein said radiation directing means comprises at least one optical component for receiving radiation from said source and forming at least one thin ring of illumination all points of which are distant from said optical axis such that said locations are encompassed by said thin ring.

21. The illumination apparatus of claim 20 wherein said radiation directing means is structured to selectively vary the distance by which said points are distant from said optical axis.

22. The illumination apparatus of claim 20 wherein said ring source comprises a multimode fiber of circular cross-section excited by said source so that the emergent modal pattern from the output end of said multimode fiber is in the form of an annular ring.

23. The illumination apparatus of claim 20 wherein said source comprises a point source and said thin ring source comprises said point source and an axicon.

24. The illumination apparatus of claim 23 wherein said axicon comprises a diffractive element.

25. An interferometric apparatus having an optical axis, said interferometric apparatus comprising:
   means for locating an object to be measured along the optical axis;
   an optical arrangement adapted to at least in part cooperate with an object to form an interferometer and facilitate the generation of interfering wavefronts in which phase information about the object is encoded; and
   means for directing radiation onto the object to be measured from different locations that are distant from said optical axis such that radiation from said locations is incident to the same points on the object along optical paths having substantially identical optical path differences within said interferometer to generate interfering wavefronts corresponding to each of said locations where each wavefront contains substantially identical phase information about the object from said interferometer.

26. The interferometric apparatus of claim 25 wherein said different locations comprise as least two that are equidistant from the optical axis, oppositely spaced along an azimuth through said optical axis, and wherein radiation therefrom is mutually coherent.

27. The interferometric apparatus of claim 26 wherein said means for directing radiation from said source comprises a diffraction grating mounted for rotation about said optical axis.

28. The interferometric apparatus of claim 26 wherein said means for directing radiation from said source comprises a holographic element mounted for rotation about said optical axis.

29. The interferometric apparatus of claim 26 wherein said means for directing radiation from said source comprises a beam splitter and two prismatic elements coupled, respectively, to two different facets of said beam splitter, said beam splitter and said prismatic elements being mounted for rotation about said optical axis.

30. The interferometric apparatus of claim 26 wherein said means for directing radiation from said source comprises a rotational shearing interferometer.

31. The interferometric apparatus of claim 30 wherein said rotational shearing interferometer comprises a pair of oppositely rotated Dove prisms.

32. The interferometric apparatus of claim 26 wherein said means for directing radiatoin from said source comprises a disk having a pair of oppositely spaced clear apertures and mounted for rotation about said optical axis.

33. The interferometric apparatus of claim 25 wherein said distant locations from which radiation is directed toward an object are equidistant from said optical axis.

34. The interferometric apparatus of claim 33 wherein said equidistant locations lie in a plane substantially perpendicular to the optical axis.

35. The interferometric apparatus of claim 25 further including means for imaging said interfering wavefronts to form an interferogrammetric image in which said phase information about the object contained in each said interfering wavefronts from said interferometer is combined to enhance signal levels while suppressing phase information from sources other than the object that would otherwise be present in said interferogrammetric image as artifacts.

36. The interferometric apparatus of claim 35 further including means for analyzing said interferogrammetric image to determine selected characteristics of the object.

37. The interferometric apparatus of claim 35 wherein said means for directing radiation onto the object to be measured comprises a point source mounted for movement around said optical axis.

38. The interferometric apparatus of claim 25 wherein said means for directing radiation onto the object to be measured comprises at least one thin ring source having a nominally constant radius and nominally centered on said optical axis.

39. The interferometric apparatus of claim 38 wherein said ring source comprises a multimode fiber of circular cross-section excited by a pump source so that the emergent modal pattern from the output end of said multimode fiber is in the form of an annular ring to form said thin ring source.

40. The interferometric apparatus of claim 38 wherein said thin ring source comprises a point source and an axicon.

41. The interferometric apparatus of claim 40 wherein said axicon comprises a diffractive element.

42. The interferometric apparatus of claim 25 wherein said means for directing radiation onto the object to be measured comprises a point source and means for selectively imaging said point source around said optical axis so that it appears to be originating from said different locations distant with respect to said optical axis.

43. The interferometric apparatus of claim 42 wherein said means for selectively imaging said point source comprises at least one rotating wedge.

44. The interferometric apparatus of claim 42 wherein said means for selectively imaging said point source comprises a pair of serially arranged rotating wedges.

45. The interferometric apparatus of claim 42 wherein said means for selectively imaging said point source comprises a beam splitter mounted for rotation in one azimuth and a wedge mounted for rotation in another azimuth.

46. The interferometric apparatus of claim 42 wherein said means for selectively imaging said point source comprises serially arranged mirrors, one mounted for rotation in azimuth and the other for rotation in elevation.

47. The interometric apparatus of claim 35 further including means for facilitating phase shifting interferometric analysis of said selected characteristics of said object.

48. The interferometric apparatus of claim 25 wherein said means for directing radiation onto the object to be measured is adapted to collimate said radiation.

49. The interferometric apparatus of claim 35 wherein said means for imaging said optical interferometric beams to form an interferogrammetric image comprises collimating and converging lenses.

50. The interferometric apparatus of claim 35 further including a detector for receiving said interferogrammetric image to generate an electronic output signal for subsequent analysis, said detector having a given sampling rate.

51. The interferometric apparatus of claim 50 wherein said interferogrammetric image is formed during a predetermined time period that is no more than the period of said given sampling rate of said detector.

52. The interferometric apparatus of claim 50 wherein said predetermined time period is substantially zero so that the object to be measured receives radiation from said at least two locations substantially simultaneously.

53. An illumination method for use with an interferometer having an optical axis, said illumination method comprising the steps of:
generating radiation from at least one source; and
directing radiation from said at least one source toward an object to be measured from different locations that are distant from said optical axis such that radiation from said locations is incident to the same points on the object along optical paths having substantially identical optical path differences within the interferometer.

54. The illumination method of claim 53 wherein said different locations comprise at least two that are equidistant from the optical axis, oppositely spaced along an azimuth through said optical axis, and wherein radiation therefrom is mutually coherent.

55. The illumination method of claim 54 wherein said radiation from said source is directed by a diffraction grating mounted for rotation about said optical axis.

56. The illumination method of claim 54 wherein radiation from said source is directed by a holographic element mounted for rotation about said optical axis.

57. The illumination method of claim 54 wherein said radiation from said source is directed by a beam splitter and two prismatic elements coupled, respectively, to two different facets of said beam splitter, said beam splitter and said prismatic elements being mounted for rotation about said optical axis.

58. The illumination method of claim 54 wherein said radiation from said source is directed by a rotational shearing interferometer.

59. The illumination method of claim 58 wherein said rotational shearing interferometer comprises a pair of oppositely rotated Dove prisms.

60. The illumination method of claim 54 wherein said radiation from said source is directed by a disk having a pair of oppositely spaced clear apertures and mounted for rotation about said optical axis.

61. The illumination method of claim 53 wherein said distant locations from which radiation is directed toward an object are equidistant from said optical axis.

62. The illumination method of claim 61 wherein said equidistant locations lie in a plane that is substantially perpendicular to the optical axis.

63. The illumination method of claim 53 wherein said radiation from each of said locations is directed toward an object at substantially the same time.

64. The illumination method of claim 53 wherein said radiation from each of said locations is directed toward an object at different times during a predetermined time period.

65. The illumination method of claim 64 further including the step of detecting radiation from the object during a capture period and wherein said predetermined time period is no more than said capture period.

66. The illumination method of claim 53 further including the step of generating radiation from a point source and directing the radiation from the point source by rotating said point source around said optical axis at a predetermined rate such that radiation emanating from said point source appears to be originating from said two different locations.

67. The illumination method of claim 53 wherein said radiation is directed by selectively imaging said source at different distant locations around said optical axis at different times.

68. The illumination method of claim 53 wherein the step of directing radiation comprises receiving radiation from said source and forming at least one thin ring of illumination all points of which are distant from said optical axis such that said two locations are encompassed by said thin ring.

69. The illumination method of claim 68 further including the step of selectively varying the distance by which said points are distant from said optical axis.

70. An interferometric method comprising the steps of:
locating an object to be measured along an optical axis;
arranging optical components adapted to at least in part cooperate with an object to form an interferometer and facilitate the generation of interfering wavefronts in which phase information about the object is encoded; and
directing radiation onto the object to be measured from different locations that are distant from said optical axis such that radiation from said locations is incident to the same points on the object along optical paths having substantially identical optical path differences within said interferometer to generate interfering wavefronts corresponding to each of said locations where each wavefront contains substantially identical phase information about the object from said interferometer.

71. The interferometric method of claim 70 further including the step of imaging said interfering wavefronts to form an interferogrammetric image in which said phase information about the object contained in each of said interfering wavefronts from said interferometer is combined to enhance signal levels while suppressing phase information from sources other than the object that would otherwise be present in said interferogrammetric image as artifacts.

72. The interferometric method of claim 71 further including the step of analyzing said interferogrammetric image to determine selected characteristics of the object.

73. The interferometric method of claim 70 wherein said different locations comprise at least two that are equidistant from the optical axis, oppositely spaced along an azimuth through said optical axis, and wherein radiation therefrom is mutually coherent.

74. The interferometric method of claim 73 wherein said radiation from said source is directed by a diffraction grating mounted for rotation about said optical axis.

75. The interferometric method of claim 73 wherein said radiation from said source is directed by a holographic element mounted for rotation about said optical axis.

76. The interferometric method of claim 73 wherein said radiation from said source is directed by a beam splitter and two prismatic elements coupled, respectively, to two different facets of said beam splitter, said beam splitter and said prismatic elements being mounted for rotation about said optical axis.

77. The interferometric method of claim 73 wherein radiation from said source is directed by a rotational shearing interferometer.

78. The interferometric method of claim 77 wherein said rotational shearing interferometer comprises a pair of oppositely rotated Dove prisms.

79. The interferometric method of claim 73 wherein said radiation from said source is directed by a disk having a pair of oppositely spaced clear apertures and mounted for rotation about said optical axis.

80. The interferometric method of claim 70 wherein radiation is directed onto the object to be measured by at least one thin ring source having a nominally constant radius and nominally centered on said optical axis.

81. The interferometric method of claim 72 further including the step of introducing phase shifts in said interfering wavefronts and performing phase shifting interferometric analysis to determine said selected characteristics of said object.

82. The inteferometric method of claim 81 wherein said step of introducing phase shifts into said interfering wavefronts comprises the step of changing the radial position of said two locations.

83. The interferometric method of claim 71 further including the step of detecting said interferogrammetric image to generate an electronic output signal for subsequent analysis, said detecting step occurring during a given sampling period.

84. The interferometric method of claim 82 wherein said interferogrammetric image is formed during a time that is no more than said given sampling period.

85. Apparatus for illuminating an object under test in an interferometer having an optical axis, said apparatus comprising:

at least one source of radiation; and means for directing radiation from said source at the object from different locations that are distant from the optical axis such that radiation from said locations is incident to the same points on the object along optical paths having substantially identical optical path differences within the interferometer, wherein said different locations comprise at least two that are equidistant from the optical axis, oppositely spaced along an azimuth through said optical axis, and wherein radiation therefrom is mutually coherent.

86. An interferometric apparatus having an optical axis, said interferometric apparatus comprising:

means for locating an object to be measured along the optical axis;

an optical arrangement adapted to at least in part cooperate with an object to form an interferometer and facilitate the generation of interfering wavefronts in which phase information about the object is encoded; and means for directing radiation onto the object to be measured from different locations that are distant from said optical axis such that radiation from said locations is incident to the same points on the object along optical paths having substantially identical optical path differences within said interferometer to generate interfering wavefronts corresponding to each of said locations where each wavefront contains substantially identical phase information about the object from said interferometer, wherein said different locations comprise at least two that are equidistant from the optical axis, oppositely spaced along an azimuth through said optical axis, and wherein radiation therefrom is mutually coherent.

87. An Illumination method for use with an interferometer having an optical axis, said illumination method comprising the steps of:

generating radiation from at least one source; and directing radiation from said at least one source toward an object to be measured from different locations that are distant from said optical axis such that radiation from said locations is incident to the same points on the object along optical paths having substantially identical optical path differences within the interferometer, wherein said different locations comprise at least two that are equidistant from the optical axis, oppositely spaced along an azimuth through said optical axis, and wherein radiation therefrom is mutually coherent.

88. An interferometric method comprising the steps of:

locating an object to be measured along an optical axis;

arranging optical components adapted to at least in part cooperate with an object to form an interferometer and facilitate the generation of interfering wavefronts in which phase information about the object is encoded; and directing radiation onto the object to be measured from different locations that are distant from said optical axis such that radiation from said locations is incident to the same points on the object along optical paths having substantially identical optical path differences within said interferometer to generate interfering wavefronts corresponding to each of said locations where each wavefront contains substantially identical phase information about the object from said interferometer, wherein said different locations comprise at least two that are equidistant from the optical axis, oppositely spaced along an azimuth through said optical axis, and wherein radiation therefrom is mutually coherent.

* * * * *